United States Patent [19]

Swis et al.

[11] Patent Number: 4,518,268

[45] Date of Patent: May 21, 1985

[54] DIESEL ENGINE DIAGNOSTIC SYSTEM

[75] Inventors: Philip E. Swis, Armada; Anthony E. DiFonzo, Clawson, both of Mich.

[73] Assignee: Sun Electric Corporation, Crystal Lake, Ill.

[21] Appl. No.: 476,618

[22] Filed: Mar. 18, 1983

[51] Int. Cl.³ .......................................... G01M 15/00
[52] U.S. Cl. ...................................... 374/144; 73/116
[58] Field of Search ............. 374/144, 145; 73/119 A, 73/116

[56] References Cited

U.S. PATENT DOCUMENTS

| | | | |
|---|---|---|---|
| 3,942,363 | 3/1976 | Swis et al. | 73/116 |
| 4,015,466 | 4/1977 | Stick et al. | 73/116 |
| 4,015,467 | 4/1977 | Armstrong | 73/116 |
| 4,046,003 | 9/1977 | Armstrong et al. | 73/116 |
| 4,050,297 | 9/1977 | Pettingell et al. | 73/117.2 |
| 4,055,993 | 11/1977 | Rackliffe et al. | 73/116 |
| 4,055,995 | 11/1977 | Armstrong et al. | 73/116 |
| 4,055,998 | 11/1977 | Pettingell et al. | 73/119 R |
| 4,061,025 | 12/1977 | Willenbecher et al. | 73/116 |
| 4,061,026 | 12/1977 | Goodfriend et al. | 73/116 |
| 4,062,231 | 12/1977 | Mercik, Jr. et al. | 73/116 |
| 4,064,746 | 12/1977 | Mercik, Jr. et al. | 73/116 |
| 4,064,747 | 12/1977 | Rackliffe et al. | 73/116 |
| 4,069,707 | 1/1978 | Cook et al. | 73/116 |
| 4,069,712 | 1/1978 | Armstrong et al. | 73/118 |
| 4,125,894 | 11/1978 | Cashel et al. | 364/442 |
| 4,128,005 | 12/1978 | Arnston et al. | 73/117.3 |
| 4,227,402 | 10/1980 | Dooley et al. | 73/115 |
| 4,397,176 | 8/1983 | Rohde et al. | 374/144 X |

OTHER PUBLICATIONS

Brochure entitled: Introducing Compuchek—The New Computerized Diesel Engine Diagnostic System, (Cummings Engine Company, Inc.; Bulletin No. 3377995-00).

Article entitled: Why Dieselsense Makes a Lot of Sense, by Bob Schultz.

Nagao, F. et al., Measurement of Cylinder . . . Engines, Bulletin Japanese Society of Mech. Engineers, vol. 13, No. 64, Oct. '70, pp. 1240-1246.

Primary Examiner—Jerry W. Myracle
Attorney, Agent, or Firm—Allegretti, Newitt, Witcoff & McAndrews, Ltd.

[57] ABSTRACT

A system for analyzing a diesel engine and transmitting data regarding faults within the diesel engine. Many diesel engines include glow plugs. The electrical characteristics of glow plugs are related to temperatures within the diesel engine which, in turn, are related to the operational characteristics of the diesel engine. The system measures the electrical characteristics of a glow plug, or other sensors, to determine attributes of the diesel engine and responsively provide a display representative of the operational characteristics.

20 Claims, 31 Drawing Figures

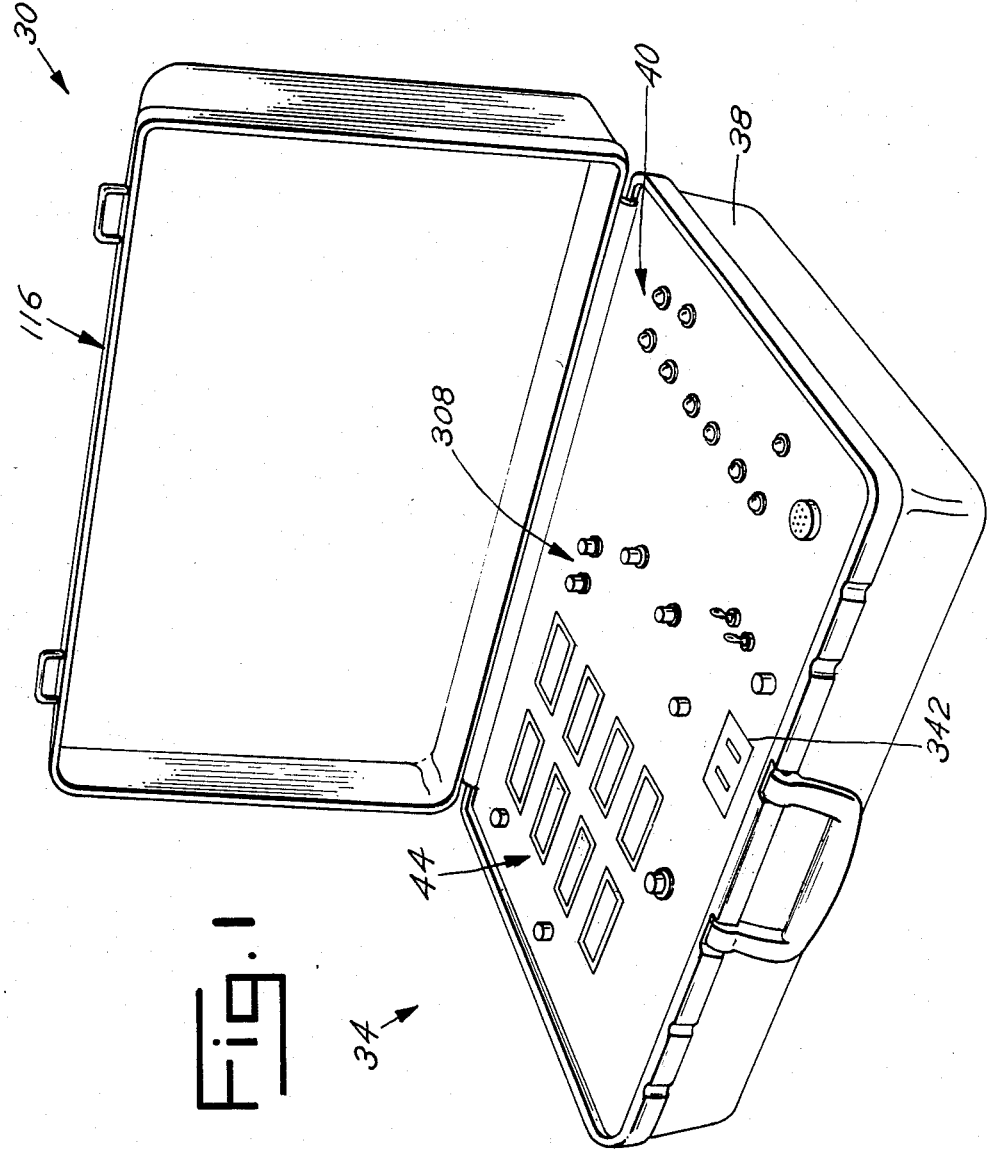

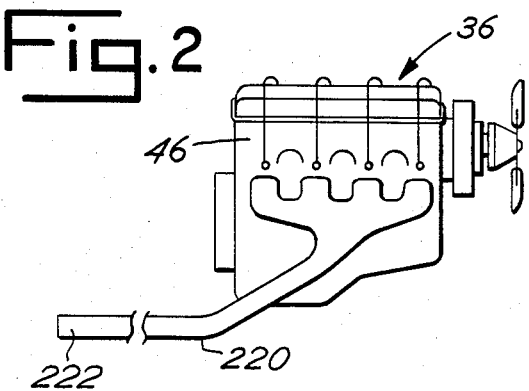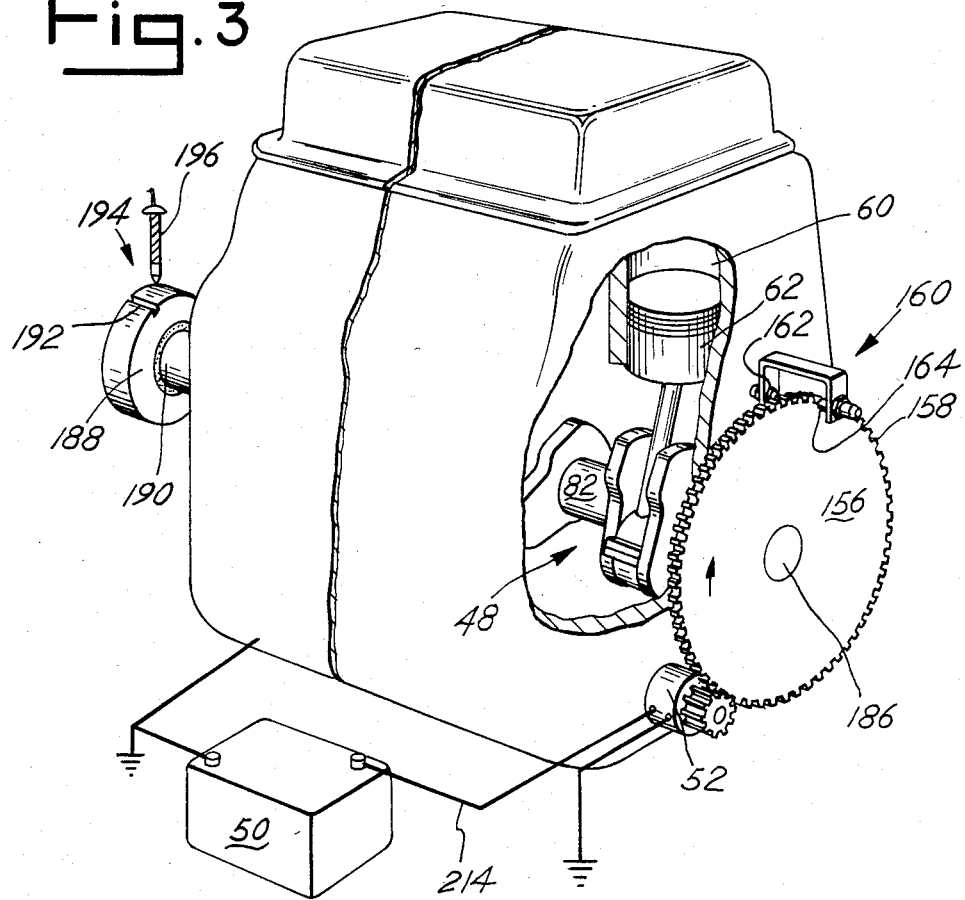

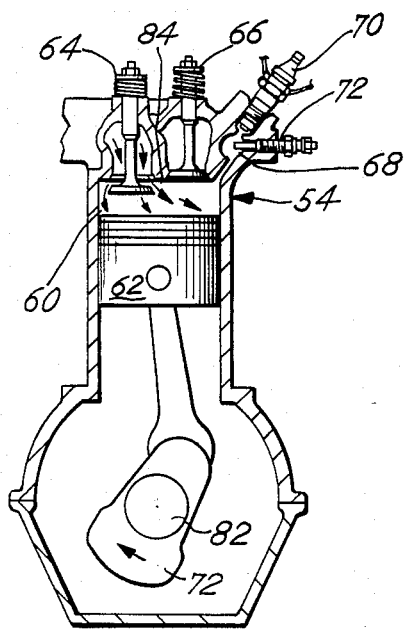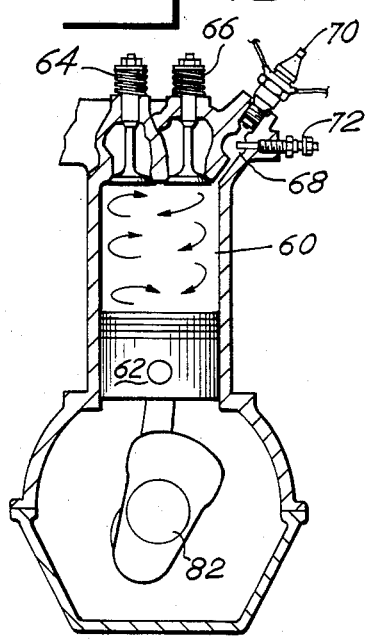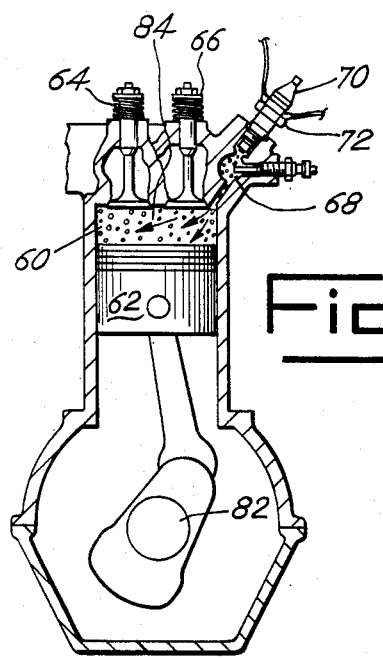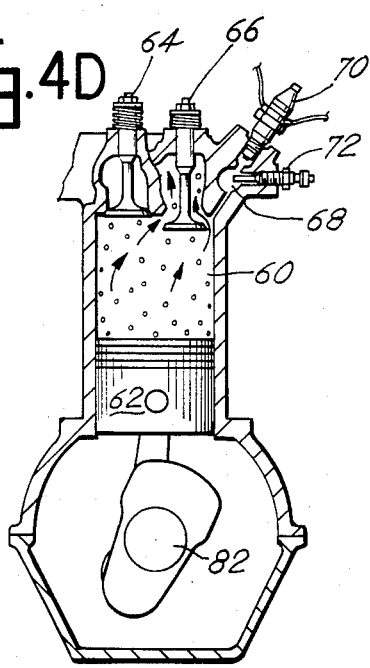

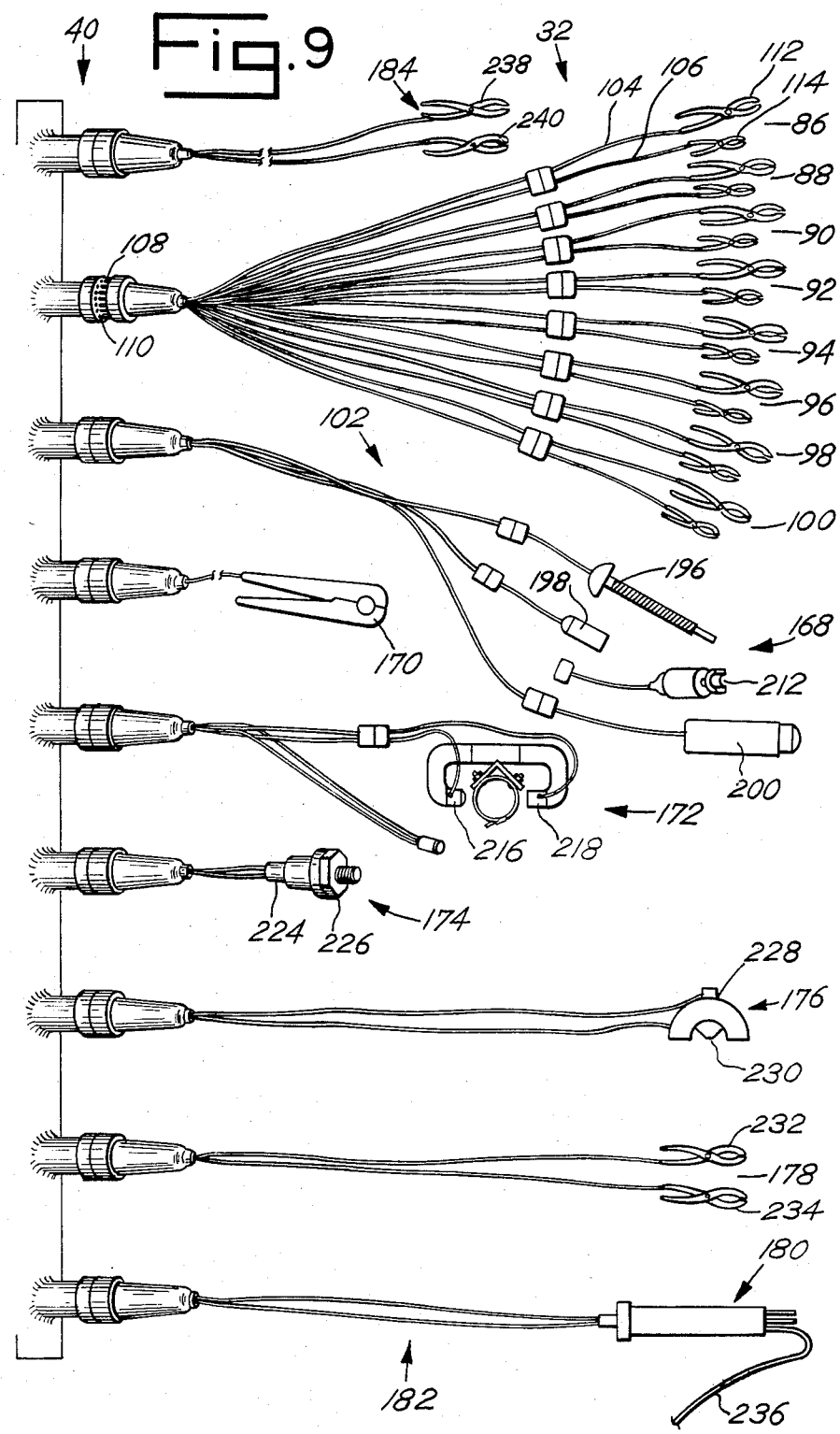

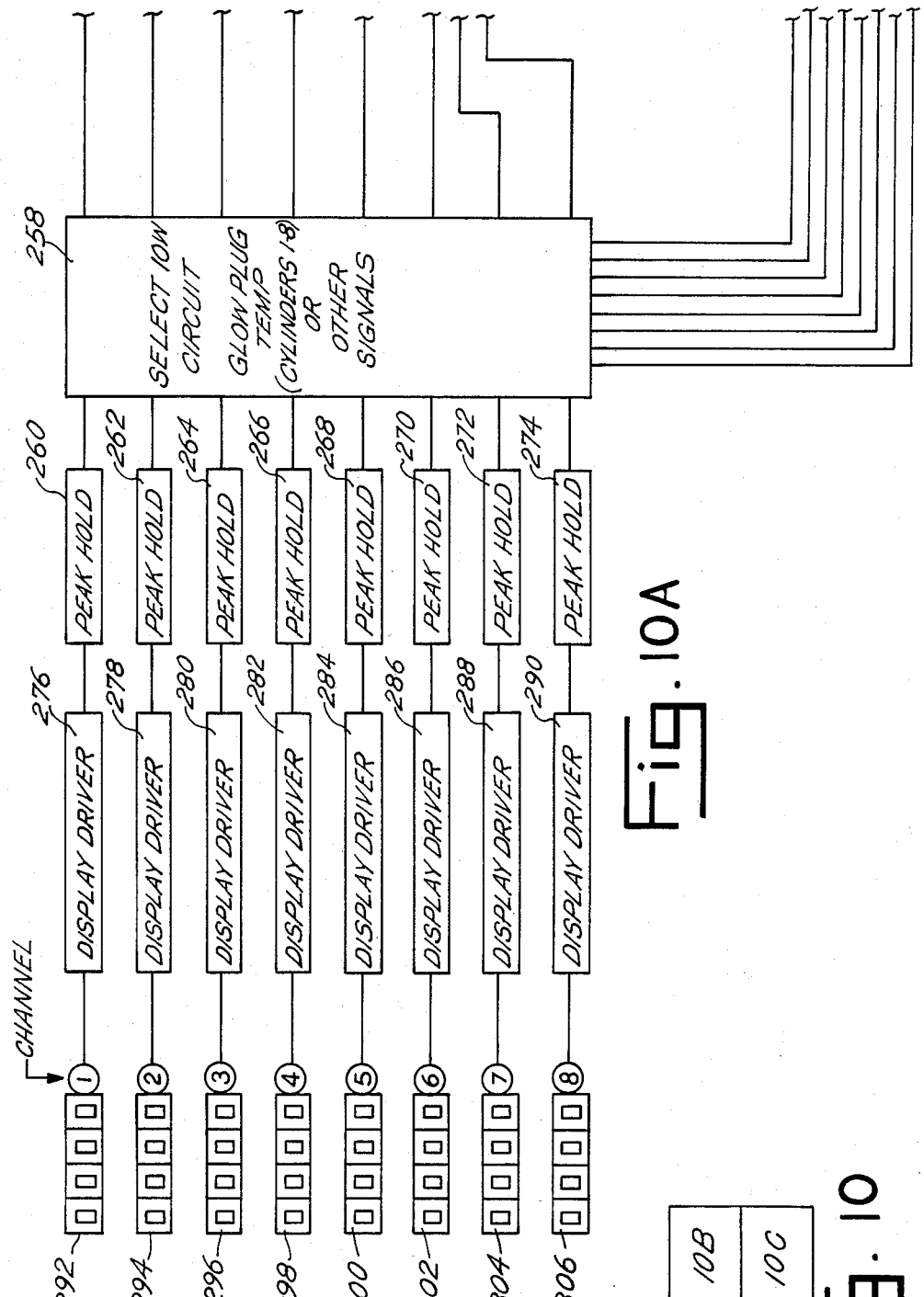

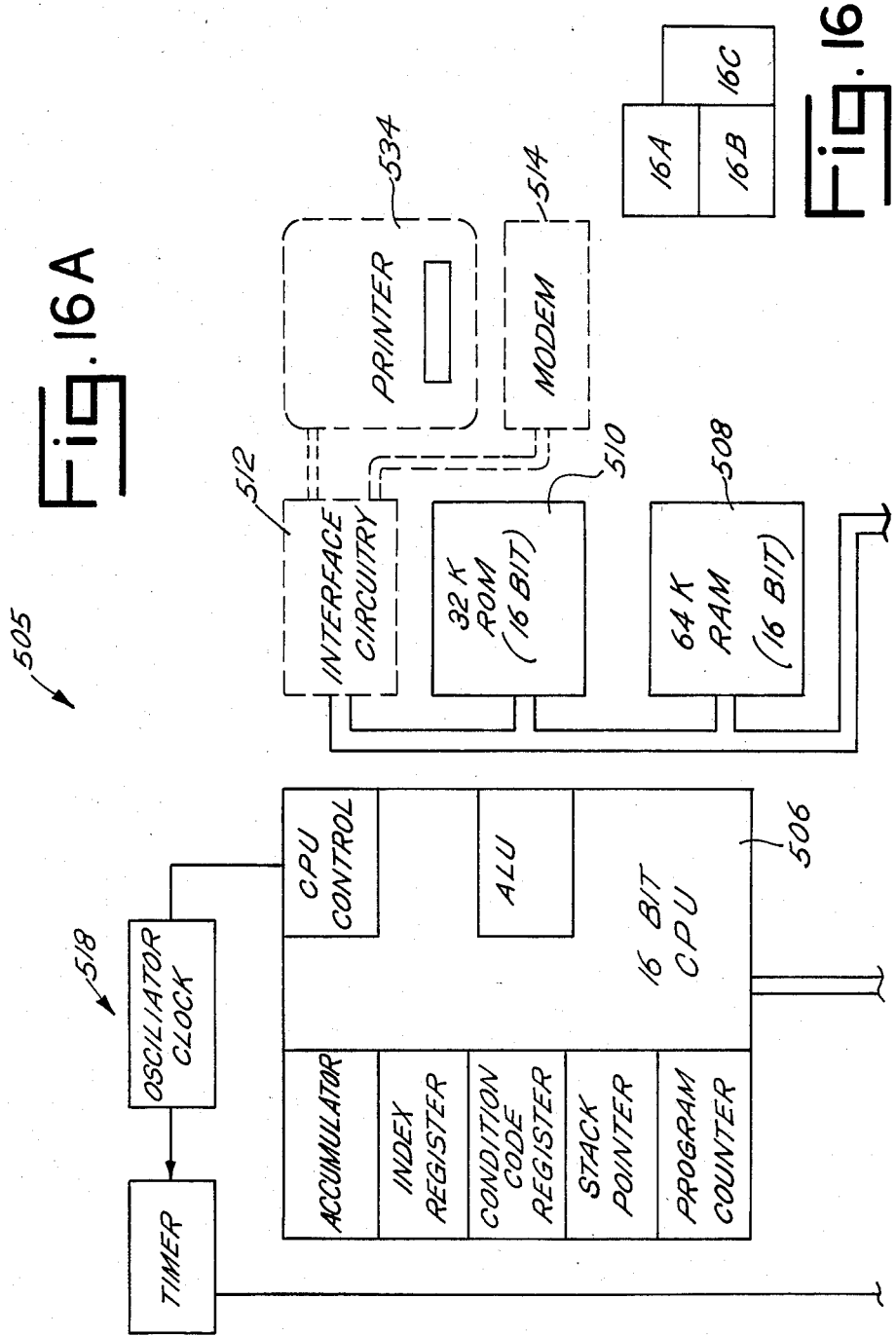

SIGNAL VOLTAGE

TIME

DIESEL ENGINE DIAGNOSTIC SYSTEM

BACKGROUND OF THE INVENTION

The present invention relates to a diagnostic system for diesel engines and more particularly to a hardware type and monoboard micro-computer diesel engine fault diagnostic system.

Diesel engines are often used in industrial applications, such as over-the-road trucks or electric gnerating plants. If such an engine stops operating or begins to run poorly, the owner must have it repaired quickly. Otherwise, the malfunctioning equipment may prevent him from running his business. Of course, repairs should also be as inexpensive as possible.

Under one of the more common methods of repairing a diesel engine, a mechanic simply guesses what part or parts of the engine are malfunctioning. The parts are then either replaced or adjusted. If the engine still does not perform properly, the mechanic makes additional guesses and replaces more parts.

This trial and error approach can be expensive if the mechanic guesses wrong and continues to unnecessarily replace operable parts. More importantly, the diesel engine can remain inoperable for extended periods while the mechanic continues to search for the true problem.

Diesel diagnostic equipment does exist that monitors a diesel engine's operation and helps a mechanic identify an engine fault—why the engine doesn't run or runs poorly. Much existing diagnostic equipment, however, is extremely expensive. Moreover, the equipment is complicated and time-consuming to set up and operate.

In addition, much existing diagnostic equipment is too heavy and bulky to be readily transported. Thus, the equipment cannot easily be taken "into the field" and used, for example, on a diesel truck engine that has stalled along the road. Further, most existing devices require the use of special sensors, which must be mounted on or screwed into the diesel engine. Attaching such sensors to the engine may be time-consuming. Moreover, the sensors are expensive and their use may cause the engine to operate differently than it would if the sensors were not attached. As a result, the sensors fail to accurately detect how the engine oprates under normal (non-testing) conditions, and the effectiveness of the diagnostic equipment is decreased.

Each diesel engine includes at least one internal chamber having a vapor within it. When running in a normal, working state, the diesel engine compresses a vapor within the internal chamber and injects a combustible fuel mixture into the chamber. The mixture fires, or explodes, and residual gasses and materials are expelled from the internal chamber.

The movement of parts within the diesel engine that completes such a process defines a working cycle for the diesel engine. The average temperature of the vapor within the internal chamber over a complete working cycle of the diesel engine has, for convenience, given the name "Brake Mean Effective Temperature" by the present inventors.

The present inventors have determined that the brake mean effective temperature is an extremely good indicator of how effectively the diesel engine compresses the vapor within the internal chamber. Moreover, the brake mean effective temperature provides useful data regarding the structural integrity of the diesel engine and its operating characteristics.

Moreover, the internal chambers of many diesel engines include a prechamber and cylinder and a glow plug partially within the prechamber. The glow plug includes an electrically resistive element that may heat up to over 900° centigrade. During the normal, running operation of the diesel engine, a combustible fuel mixture is injected into the prechamber, heated by the glow plug, and ignited.

Under such conditions, the glow plug is an "active" element: it "acts on" the prechamber and fuel mixture, causing them to warm. The present inventors have discovered, however, that the compression and combustion of the fuel mixture also affects the glow plug. Thus, the glow plug can also be used as a "passive" element, where the compression and combustion "act on" the glow plug, affecting its electrical characteristics.

The present inventors have ascertained that by monitoring the electrical characteristics of the glow plugs within a diesel engine, the brake mean effective temperature and other operating characteristics of the engine may be ascertained. Moreover, sensors to monitor glow plugs may be combined with other sensors to form a more inexpensive and portable fault diagnostic system for a diesel engine.

SUMMARY OF THE INVENTION

In accordance with a principal feature of the present invention, a temperature sensor is interconnected to the diesel engine. The sensor is influenced by the temperature of the vapor within the internal chamber over a working cycle of the diesel engine and provides a temperature signal that represents the temperature. A display is interconnected to the sensor and receives the temperature signal. Consequently, the display provides a representation of the brake mean effective temperature.

According to a further feature of the present invention, the glow plug includes a thermal mass, such that it assumes a temperature close to a changed ambient temperature only after a measurable period of time. The temperature of the prechamber changes relatively quickly, and the glow plug cannot reflect to the maximum and minimum temperatures of the prechamber, because these extreme temperatures exist for such short periods of time. Thus, the temperature sensor includes a glow plug having a thermal mass such that the glow plug provides a temperature signal that represents the average temperature of the vapor within the prechamber over a working cycle of the diesel engine.

An additional object of the present invention is an analyzer that uses several different sensors, including at least one glow plug, to more quickly and cheaply analyze a diesel engine. Still yet another object is an analyzer that receives the signals from such sensors and compares the signals with predetermined values to more quickly and inexpensively determine a fault of the diesel engine.

BRIEF DESCRIPTION OF THE DRAWING

FIG. 1 is a perspective view of a preferred embodiment of the present invention;

FIG. 2 is a schematic diagram of a diesel engine to be tested with the invention of FIG. 1;

FIG. 3 is a schematic diagram of major elements of the diesel engine of FIG. 2;

FIGS. 4A-4D are a series of schematic diagrams showing how the diesel engine of FIG. 2 operates;

FIG. 9 is a diagram of the sensors of the invention of FIG. 1;

FIGS. 16A-16C are a series of block diagrams of a microcomputer that may be used with the invention of FIG. 1;

DETAILED DESCRIPTION OF THE PREFERRED EMBODIMENT

Figure 5:
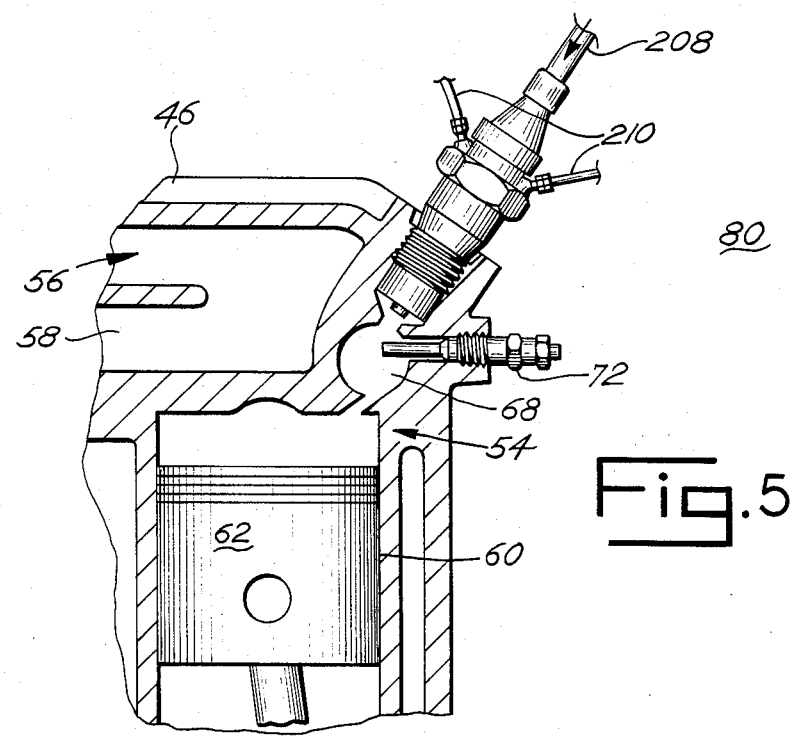
FIG. 5 is a diagram of an internal chamber and glow plug found within the diesel engine shown in FIG. 2.

Referring to FIGS. 1-19, the preferred embodiment of the present invention is shown as diesel engine diagnostic system 30. As shown in FIGS. 1 and 9, the diagnostic system 30 comprises sensors 32 and a display 34. The sensors 32 interconnect the display 34 with a vehicle (not shown) having a diesel engine 36 (FIG. 2). The term display 34 refers to all parts of the present invention that are not sensors 32. The display 34 includes a case 38, input sockets 40, processing circuit 42, and display panels 44.

In order to more fully describe applicants' invention, the operation of the diesel engine 36 is set out below. As shown in FIGS. 2-5, the engine 36 includes a block 46, drive train 48, electric battery 50, and electric starting motor 52.

The block 46 defines an internal chamber 54 and a coolant chamber 56. The coolant chamber 56 includes circulating water 58 to reduce the temperature of the block 46 during the operation of the engine 36. (Note that while water or a water and antifreeze solution are often used as a coolant, some diesel engines use air or oil as a coolant). The internal chamber 54 includes a cylinder 60, piston 62 within the cylinder 60, intake and exhaust valves 64, 66, prechamber 68, fuel injector 70, and glow plug 72.

Figure 6:
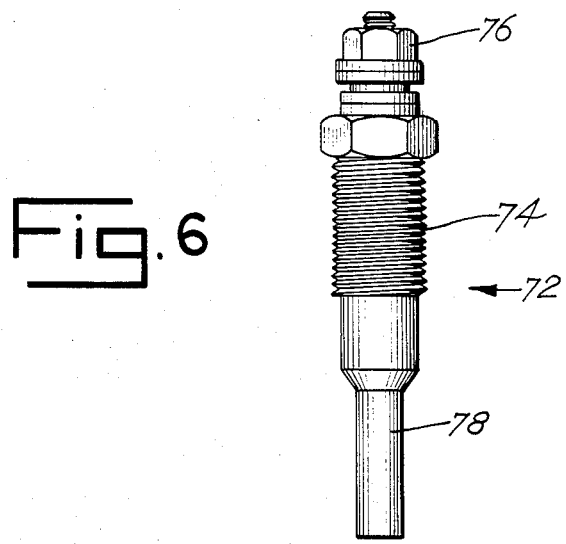
FIG. 6 is a side view of the glow plug shown in FIG. 5.
Figures 7, 8:
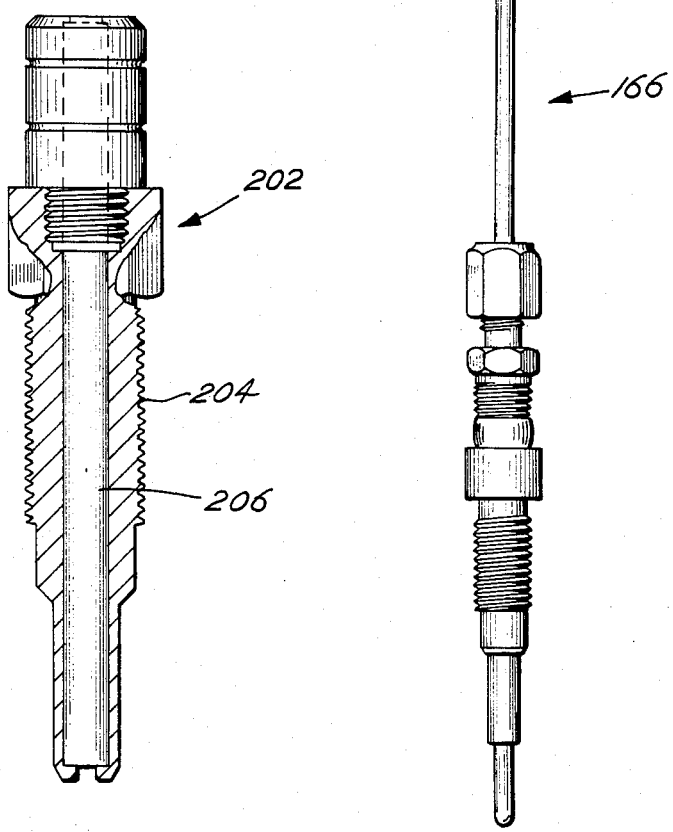
FIG. 7 is a side view of a thermocouple that may be used with the invention of FIG. 1.
FIG. 8 is a side view of a glow plug having a quartz rod that may be used with the invention of FIG. 1.

As shown in FIG. 6, the glow plug 72 includes a threaded shell 74, electrical connector 76, and resistive element 78. As more particularly shown in FIG. 5, the threaded shell 74 allows the glow plug 72 to be screwed into the block 46 of the engine 36, much like any common bolt may be screwed into a threaded hole.

The resistive element 78 extends from the threaded shell 74 into the prechamber 68. The electrical connector 76 also extends from the threaded shell 74, but is accessible to the environment 80 of the engine 36 rather than the prechamber 68.

When interconnected to the electric battery 50 of the engine 36, the electrical connector 70 receives up to 10 amps of electric current. Normally, the current passes through the resistive element 78, through the threaded shell 74 and block 46 of the engine 36, and back to the battery 50.

The resistive element 78 may have a resistance between 0.5 and 25 ohms. Typically, the resistive element 78 heats to a temperature of between 900° and 1200° centigrade.

The drive train 48 includes a rotatable crankshaft 82 interconnected to the piston 62 (FIG. 3). While the engine 36 is in a normal running state, the crankshaft 82 rotates, moving the piston 62.

As seen in FIG. 4A, when the crankshaft 82 rotates so as to drive the piston 62 downward, the intake valve 64 opens and allows air to flow into the cylinder 60. FIG. 4B shows that the crankshaft 82 continues to rotate and the piston 62 moves upward, compressing the air within.

Just before the piston 62 reaches its uppermost position, top dead center 84, the fuel injector 70 meters a precise jet of highly pressurized liquid fuel into the prechamber 68 (FIG. 4C). The fuel becomes atomized, passes the glow plug 72, and becomes hot. During the operation of the engine 36, the temperature of vapors within the prechamber 68 is, on average, about 56° centigrade higher than the temperature of the vapors within the cylinder 60.

The movement of the piston 62 compresses the air within the cylinder 60 and causes a temperature increase in the cylinder 60 and prechamber 68. Most diesel fuel mixtures require a minimum temperature of about 294° centigrade to ignite. The increase in temperature from both the glow plug 72 and pressure buildup from the piston 62 is normally sufficient to fire the atomized fuel.

Thus, as shown in FIG. 4C, the mixture ignites and rapidly expands, driving the piston 62 down. Finally, as shown in FIG. 4D, the piston 62 rises again, expelling exhaust gases and particles through the exhaust valve 66.

The series of steps indicated in FIGS. 4A-4D, where the piston moves down from top dead center 84, takes in ambient air vapor, compresses it, injects fuel which spontaneously is ignited, and moves back to Top Dead Center 84 to expell exhaust gases, defines a working cycle for the engine 36. Vapor in this specification is used to mean any type of gas, both with and without fuel or other types of particles in it.

The sensors 32 of the diagnostic system 30 include eight pairs of glow plug attachments 86, 88, 90, 92, 94, 96, 98, 100, as well as "active" sensors 102. (FIG. 9).

Many diesel engines include eight cylinders. If such engines are of the "indirect" injection type, they also include eight prechambers and, thus, eight glow plugs. The eight pairs of glow plug attachments 86-100 are provided so that one pair of attachments can be interconnected with every glow plug 72 of an eight cylinder engine. Since all of the glow plug attachments 86-100 are substantially the same, only the pair of glow plug attachments 86 is discussed below for illustration.

The pair of glow plug attachments 86 includes two wire leads 104, 106 each having a male plug 108, 110 on one end and a self-closing alligator clip 112, 114 on the other. During the operation of the system 30, one of the alligator clips 112 is snapped onto the electrical connector 76 of the glow plug 72, and the other alligator clip 114 is attached either to the shell 74 of the glow plug 72 or to the injector 70. The male plugs 108, 110 are inserted into one of the input sockets 40.

As shown in FIGS. 1 and 10A-10C and as previously described, a preferred embodiment of the display 34 includes the case 38 having the input sockets 40, processing circuit 42, and display panels 44. The processing circuit 42 receives signals from the glow plug attachments 96-100 and active sensors 102 via the input sockets 40. The processing circuit 42 then uses the signals to analyze the engine 36 and responsively provides signals to the display panels 44, so that the results of the analysis may be viewed by the operator (not shown) of the system 30.

Note that the case 38 of the present invention could easily be modified. For example, the system 30 may be packaged in a much larger case 38 than that shown in FIG. 1 and mounted on wheels (not shown).

The passive electrical characteristics of the glow plug 72 are important, since the present inventors have discovered that such characteristics are highly correlated to the structural integrity of the diesel engine 36. For each diesel engine 36, there exists an optimum range of values for the temperature of the vapors within its cylinders. If the temperature of the vapors within the cylinder 60 is higher or lower than the range, the engine 36 is probably malfunctioning. This is true whether the engine 36 is in a "cranking" or "running" state.

The engine 36 defines a "cranking state" when a fuel supply (not shown) is disconnected from the fuel injector 70. Instead of rotating under the power of an igniting fuel mixture, the crankshaft 74 is rotated by the electric starting motor 52 interconnected to the engine 36. The piston 62 and cylinder 60 continue to compress and exhaust vapor. However, no fuel enters the cylinder 60.

The engine 36 defines a "running state" when the fuel injector 70 is connected to the fuel supply and the crankshaft 82 rotates as a result of a fuel mixture firing inside of the cylinder 60. This process is described previously and diagrammed in FIGS. 4A-4D. The ability of the piston 62 to compress vapor is highly correlated to the temperature of the vapor within the internal chamber 54. The higher the compression, the higher the temperature of the vapor is.

Consequently, the higher the compression of cylinder and piston is, the greater the glow plug resistance or voltage output is. This relation is substantially true while the engine 36 is both in a cranking state and running state.

The present inventors have coined the phrase "Brake Mean Effective Temperature" (BMET) to describe the average temperature of the vapor within the internal chamber 54 over a working cycle of the engine 36. Since temperature and engine performance are highly correlated, the brake mean effective temperature is also highly correlated with the operating characteristics of the engine 36.

In addition, the present inventors have discovered that the electrical resistance and voltage output (millivolt level) of the glow plug 72 are both directly correlated with the brake mean effective temperature: the greater the brake mean effective temperature is, the greater the glow plug resistance or voltage output is.

The glow plug 72 is made of materials having a thermal mass, or resistance to thermal change, such that the electrical characteristics of the glow plug 72 represent the average temperature within the internal chamber 54. Most glow plugs have a response time of 0.2 to 0.3 seconds. Thus, after the temperature of the internal chamber 54 changes, the glow plug 72 requires 0.2 to 0.3 second before it has gained or lost enough heat to exhibit 63% of the change in resistance or other electrical characteristics that it would ultimately make because of the prechamber temperature change.

Soon after the glow plug 72 starts to heat up because of a higher temperature within the internal chamber 54, it starts to cool down because of a sudden lower temperature within the internal chamber 54. The glow plug 72 never fully reacts to the higher temperature because, as soon as the glow plug 72 starts to heat up, it begins to react to the sudden lower temperature.

The glow plug 72 behaves much as though the temperature of the vapors within the internal chamber 54 was staying near the average of the maximum and minimum values. As a result, the maximum temperatures within the internal chamber 54, which last for only a few milliseconds, are not fully reflected by the electrical characteristics of glow plug 72. This can be a desirable attribute of glow plugs, however, since brake mean effective temperature, an important indicator of an engine's performance characteristics, is defined in terms of an average temperature.

Approximate empirical relations between compression within the cylinder 60, the cylinder's brake mean effective temperature, and the resistance of a common, prechamber injection diesel glow plug have been determined by the present inventors. Such approximate relations for four different types of readily available glow plugs, as used in a six cylinder, normally aspirated diesel engine while the engine is in a cranking state, are shown in the tables below:

| Cylinder No. | Pressure of Vapors Within Cylinder (pounds per square inch) | Brake Mean Effective Temperature (degrees centigrade) | Glow Plug Resistance (ohms) |
|---|---|---|---|
| General Motors AC Style Glow Plug | | | |
| 1. | 50 | 66 | 0.05 |
| 2. | 155 | 88 | 0.125 |
| 3. | 360 | 110 | 0.3 |
| 4. | 460 | 124 | 0.425 |
| 5. | 560 | 138 | 0.55 |
| 6. | 660 | 152 | 0.675 |
| Volkswagen Bosch Style Glow Plug | | | |
| 1. | 50 | 66 | 0.30 |
| 2. | 155 | 83 | 0.41 |
| 3. | 360 | 100 | 0.82 |
| 4. | 460 | 117 | 1.23 |
| 5. | 560 | 134 | 1.95 |
| 6. | 660 | 150 | 2.67 |
| Toyo Kogyo (Mazda) JKC Style Glow Plug | | | |
| 1. | 50 | 66 | 0.38 |

-continued

| Cylinder No. | Pressure of Vapors Within Cylinder (pounds per square inch) | Brake Mean Effective Temperature (degrees centigrade) | Glow Plug Resistance (ohms) |
|---|---|---|---|
| 2. | 155 | 76 | 0.51 |
| 3. | 360 | 86 | 0.63 |
| 4. | 460 | 96 | 0.75 |
| 5. | 560 | 105 | 0.88 |
| 6. | 660 | 115 | 1.00 |
| Isuzu JKC Style Glow Plug | | | |
| 1. | 50 | 66 | 0.80 |
| 2. | 155 | 78 | 0.98 |
| 3. | 360 | 91 | 1.15 |
| 4. | 460 | 103 | 1.33 |
| 5. | 560 | 116 | 1.50 |
| 6. | 660 | 128 | 1.68 |

The compression values above were taken after the engine 36 had been in a cranking state for approximately 10 seconds and then stopped. In each of the four examples, the readings for cylinder No. 5 suggests that the piston 62 and cylinder 60 are functioning properly. The values for cylinder Nos. 1-4 show that the tested cylinders leaked when the piston 62 attempted to compress vapor within the cylinder 60.

As previously indicated, the brake mean effective temperature of the cylinder 60 may be observed while the engine 36 is in either a cranking or running state. Moreover, while in the running state, the brake mean effective temperature may be observed while the engine 36 operates at a variety of speeds and under a variety of loads.

Drastic variations in the brake mean effective temperature under such conditions may indicate faults within the engine 36. For example, if the brake mean effective temperature is acceptable for low engine speeds but too low for higher speeds, the timing of the fuel injector 70 may be faulty. Alternatively, an improper brake mean effective temperature while the engine 36 is under a load may indicate that the cylinder 60 is receiving insufficient air or that an excessive amount of air is entrapped in the fuel.

Variations in brake mean effective temperature between different cylinders in the same engine 36 should also be noted. The present inventors have observed that a difference in brake mean effective temperature for two different cylinders of between 7° to 14° centigrade indicates that the two cylinders have a difference in compression of between 40 and 70 pounds per square inch (p.s.i.). If the brake mean effective temperature and compression differ drastically from the limits set out above, continued use of the engine 36 may result in major damage to the engine 36.

The inventive concept of using an "active" engine element to "passively" sense the brake mean effective temperature of cylinder 60 may be implemented in other manners than measuring the resistance of the glow plug 72. For example, internal components of the glow plug (not shown) are made from a material that is dissimilar to that of glow plug shell 74. Thus, a small d.c. voltage potential exists between these two different materials.

Of course, such a voltage potential varies in a direct relation to how the internal resistance of the glow plug 72 varies. Thus, in order to determine the brake mean effective temperature of the cylinder 60 without sensing the resistance of the glow plug 72, one need only sense the voltage potential between electrical connector 76 (which is interconnected to the internal components of the glow plug) and the glow plug shell 74.

In the preferred embodiment of the present invention, the processing circuit 42 includes voltage sensing circuitry 122 in order to determine the d.c. voltage potential between the glow plug electrical connector 76 and the shell 74 and sends a responsive signal to the display panels 44.

Approximate, empirically-obtained relations between the compression within the cylinder 60 of a six cylinder diesel engine, brake mean effective temperature, and d.c. voltage potential of a diesel glow plug, are shown below. The approximate relations are shown for four different types of glow plugs commonly used in passenger vehicles.

| Cylinder No. | Engine State (cranking or running) | Approximate Pressure of Vapor Within Cylinder (lbs. per sq. inch) | Brake Mean Effective Temperature (degrees centigrade) | Glow Plug Voltage (millivolts, d.c.) |
|---|---|---|---|---|
| General Motors AC Style Glow Plug | | | | |
| 1. | Cranking | 50 | 66 | 0.05 |
| 2. | Cranking | 155 | 38 | 0.125 |
| 3. | Cranking | 360 | 110 | 0.30 |
| 4. | Cranking | 460 | 124 | 0.425 |
| 5. | Cranking | 560 | 138 | 0.55 |
| 6. | Cranking | 660 | 152 | 0.68 |
| 7. | Running | 800 | 400 | 1.60 |
| 8. | Running | 1000 | 510 | 1.80 |
| 9. | Running | 1200 | 620 | 2.00 |
| 10. | Running | 1450 | 732 | 2.20 |
| Volkswagon Bosch Style Glow Plug | | | | |
| 1. | Cranking | 50 | 66 | 0.34 |
| 2. | Cranking | 155 | 83 | 0.66 |
| 3. | Cranking | 360 | 110 | 1.40 |
| 4. | Cranking | 460 | 124 | 1.60 |
| 5. | Cranking | 560 | 138 | 2.10 |
| 6. | Cranking | 660 | 152 | 2.40 |
| 7. | Running | 800 | 400 | 1.60 |
| 8. | Running | 1000 | 510 | 3.00 |
| 9. | Running | 1200 | 620 | 9.90 |
| 10. | Running | 1450 | 732 | 15.50 |
| Toyo Kogyo (Mazda) JKC Style Glow Plug | | | | |
| 1. | Cranking | 50 | 66 | 0.10 |
| 2. | Cranking | 155 | 83 | 0.25 |
| 3. | Cranking | 360 | 110 | 0.43 |
| 4. | Cranking | 460 | 124 | 0.55 |
| 5. | Cranking | 560 | 138 | 0.76 |
| 6. | Cranking | 660 | 152 | 1.00 |
| 7. | Running | 800 | 400 | 1.50 |
| 8. | Running | 1000 | 510 | 1.40 |
| 9. | Running | 1200 | 620 | 0.60 |
| 10. | Running | 1450 | 732 | 3.90 |
| Isuzu JKC Style Glow Plug | | | | |
| 1. | Cranking | 50 | 66 | 0.06 |
| 2. | Cranking | 155 | 83 | 1.15 |
| 3. | Cranking | 360 | 110 | 0.42 |
| 4. | Cranking | 460 | 124 | 1.58 |
| 5. | Cranking | 560 | 138 | 0.75 |
| 6. | Cranking | 660 | 152 | 0.91 |
| 7. | Running | 800 | 400 | 5.10 |
| 8. | Running | 1000 | 510 | 1.99 |
| 9. | Running | 1200 | 620 | 0.90 |
| 10. | Running | 1450 | 732 | 12.80 |

The cylinders listed above having a brake mean effective temperature of approximately 560° centigrade during the cranking state and 620° centigrade during running state were operating properly. The cylinders having brake mean effective temperatures of approximately 732° centigrade while the engine 36 was in the running state, were associated with a "leaking" fuel injector 70.

The cylinders 60 were receiving too much fuel too early for each working cycle. This caused the piston 62 and cylinder 60 to work much harder than normal, resulting in a higher pressure, higher brake mean effective temperature, and lower durability. Too high a temperature may also suggest, for example, that the fuel/air ratio is too high, the piston 62 is rubbing excessively against the cylinder 60, the coolant chamber 56 for the engine 36 is clogged, or the fuel is being injected too early.

Some cylinders exhibited a brake mean effective temperature substantially less than 730° centigrade, while the engine 36 was in the running state. In these cylinders, air passed between the piston 62 and cylinder 60. As a result, air escaped from the cylinder 60, lessening the compressing ability of the piston 62. The brake mean effective temperature and glow plug voltage were accordingly lower. Excessively low temperatures may also result if the fuel/air ratio is too low or the fuel is of an improper grade.

It is to be understood that the values given for an acceptable brake mean effective temperature and glow plug resistance or voltage are only exemplary of many common types of glow plugs. Other glow plugs may be sold which have different impedance characteristics. The normative values for the electrical characteristics of a specific type of glow plug may easily be obtained through empirical testing by those having even less than ordinary skill in the art.

Glow plugs made by a particular manufacturer for a particular engine have surprisingly similar impedance and voltage characteristics. Thus, by measuring the resistance or voltage of several glow plugs in one engine known to be functioning properly, a normative glow plug resistance or voltage may be ascertained for all like glow plugs in similar engines.

Thus, by monitoring the resistance or voltage output of the glow plug 72, a mechanic can learn how well the piston 62 and cylinder 60 perform. The glow plug 72, which normally "acts on" or affects its environment by heating the prechamber 68, may thus be used as a "passive" element. As a passive element, the electrical characteristics of the glow plug 72 are monitored to learn about the environment by recording how the environment affects the glow plug 72.

Using the glow plug 72 as a sensor allows a mechanic to take measurements quickly and accurately. He need only attach the alligator clips 112, 114 to the electrical connector 76 of the glow plug 72 and the engine 36 and turn on the system 30.

Moreover, attaching the alligator clips 112, 114 does not alter how the engine 36 operates. As a result, the mechanic may learn how the engine 36 operates without any biasing effects from testing equipment.

In the preferred embodiment of the present invention, the voltage sensing circuitry 122 of the processing circuitry 42 includes eight separate glow plug signal conditioning circuits 124, 126, 128, 130, 132, 134, 136, 138. Moreover, the display panels 44 include eight separate digital readouts 140, 142, 144, 146, 148, 150, 153, 154. Two glow plug attachments, a signal processing circuit, and a digital readout are provided for each cylinder of an eight cylinder engine. Thus, a mechanic may simultaneously view the brake mean effective temperature of any or all of the cylinders that he chooses.

The brake mean effective temperature of an engine 36 may also be measured by sensing engine elements other than the glow plug 72. For example, as shown in FIG. 3, the crankshaft 82 of the engine 36 includes the piston 62 and a rotatable flywheel 156. The flywheel 156 includes a series of peripheral teeth 158.

As previously described, expanding vapor within the cylinder 60 drives the piston 62 downward, turning the crankshaft 82. This, in turn, causes the rotation of the flywheel 156 to accelerate sharply. Later, the flywheel 156 will decelerate until other expanding gas within another cylinder provides additional impetus to the crankshaft 82 and flywheel 156.

As shown in FIG. 3, a rotation sensor 160 may be mounted near the peripheral teeth 158 of the flywheel 156, in order to detect the angular acceleration and deceleration of the flywheel 156. The rotation sensor 160 is of a conventional design and may, for example, include a light emitter 162 and a light detector 164 and function by noting how the movement of the peripheral teeth 158 interferes with the passage the light emitted by the light emitter 162. (Alternatively, the rotation sensor 160 may include magnetic field detector (not shown) rather than a light emitter and detector 162, 164. Such a sensor functions by detecting how the movement of the teeth 158 affects a magnetic field (not shown) surrounding the rotation sensor 160.

The brake mean effective temperature of the cylinder 60 is strongly related to the amount of acceleration (and deceleration) exhibited by the flywheel 156. An observed relation between brake mean effective temperature and flywheel acceleration of a medium duty diesel engine is set forth below:

| Cylinder No. | Engine State (cranking or running) | Brake Mean Effective Temperature (degrees centigrade) | Approximate Peak Flywheel Acceleration; (degrees per second$^2$) |
| --- | --- | --- | --- |
| 1. | Cranking | 66 | 180 (deceleration) |
| 2. | Cranking | 121 | 360 (deceleration) |
| 3. | Cranking | 177 | 540 (deceleration) |
| 4. | Running | 288 | 510 (acceleration) |
| 5. | Running | 493 | 1530 (acceleration) |
| 6. | Running | 760 | 2550 (acceleration) |

Of course, further data of this type may easily be obtained for other types of engines by empirical testing.

For yet another variation of the present invention, it must be noted that the current drawn by the electric starting motor 52 is related to how hard it finds turning the crankshaft 82. If, while the engine 36 is in the cranking state, the piston 62 is compressing air within the cylinder 60 to a high level, turning the crankshaft 82 will prove difficult and the electric starting motor 52 will draw much current (not shown) from the electric battery 50. Conversely, if the piston 62 does a poor job of compressing vapor, the crankshaft 82 will be easier to turn and the starting motor 52 will draw less current.

Thus, the current drawn by the starting motor 52 is related to a cylinder's compression and, therefore, brake mean effective temperature. The observed relation between peak current drawn by a six cylinder, normally aspirated, light duty automotive diesel engine (not shown) in the cranking state and the brake mean effective temperature of a cylinder within the engine 34 is set forth below.

| Peak Current Drawn by Starting Motor (amperes, d.c.) | Brake Mean Effective Temperature (degrees centigrade) |
| --- | --- |
| 75 | 66 |
| 200 | 110 |
| 350 | 149 |
| 400 | 163 |
| 450 | 177 |

In yet another embodiment of the present invention, the glow plug 72 is removed from the prechamber 68. In this way, a thermocouple 166 (FIG. 7), or other type of heat sensor, can be substituted for the glow plug 72 and the brake mean effective temperature of the internal chamber 54 can be measured directly.

Alternatively, temperature sensors, such as the NANMAC sensor, produced by the Nanmac Co. of Framingham Center, Mass., have response times of approximately 10 microseconds. Such a heat sensor may be used to measure, virtually instantaneously, the temperature of the vapor within the internal chamber 54. The brake mean effective temperature for the internal chamber 54 could then be derived by taking frequent readings of the instantaneous temperature and arithmetically averaging the readings.

A nearly instantaneous temperature measurement would also indicate short term changes in pressure within the internal chamber 54. Thus, the increased pressure within the cylinder 60 caused by the injection of a combustible fuel mixture could be noted by observing a sudden increase in temperature. (This sudden temperature increase is commonly called "apparent heat release.") By observing the position of the piston 62 when the injection and combustion occurs, a mechanic could then determine whether the injection was occurring when the piston 62 was in a proper position within the cylinder.

In the preferred embodiment of the present invention, the passive temperature sensors glow plug attachments 86–100) represent only one set of sensors in the diagnostic system 30. Active sensors 102 are also used. Other diagnostic systems using active sensors are known in the art. Examples of such systems are described in U.S. Pat. Nos. 3,942,363, 4,015,466, 4,015,467, 4,046,003, 4,050,297, 4,055,993 4,055,995, 4,055,998, 4,061,025, 4,061,026, and 4,064,746. The disclosures of these patents are hereby incorporated into this specification by reference.

As shown in FIG. 9, the active sensors 102 within the diagnostic system 30 include a timing sensor 168, current sensor 170, exhaust sensor 172, pressure sensor 174, temperature sensor 176, voltage sensor 178, and oxygen sensor 180. Each of these sensors is interconnected to the display 34 via leads 182, and the characteristics detected by the sensors 166–188 may be portrayed on the display panels 44. In addition, a set of power leads 184 are provided, which attach to the electric battery 50 and provide electrical power for the system 30.

In order to fully explain the operation of the active sensors 102 and, in particular, the timing sensor 168, the operation of the engine 36 must be more fully described. As shown in FIG. 3, the crankshaft 82 is interconnected to the flywheel 156 at a first end 186 and to a counterbalancing weight called a harmonic balancer 188 at a second end 190. The harmonic balancer 188 is made of metal that includes a peripheral notch 192.

The harmonic balancer 188 is attached to the crankshaft 82 such that when the notch 192 is in a predetermined position, the cylinders within the engine will also be in predetermined positions. For example, in virtually all four cycle diesel engines (not shown) two of the cylinders of the engine will always be at the top dead center position 84 whenever the notch 192 has been rotated to the uppermost position 194 of the harmonic balancer 188. Since the positions of all the cylinders with the engine 36 always bear a predetermined relationship with each other, a mechanic may determine the position of all pistons if it is known that one piston is at the top dead center position 84.

The timing sensor 168 includes a top dead center pickup 196, optical pickup 198, and strobe output 200. The top dead center pickup 196 functions in a standard manner to detect changes in a magnetic field. When placed near the harmonic balancer 188, the top dead center pickup 196 provides a top dead center signal when the harmonic balancer 188 rotates such that the notch 192 is near the pickup 196. For virtually all four cycle diesel engines, if the pickup 196 is placed near the uppermost position 194 of the harmonic balancer 188, the top dead center signal occurs only when a predetermined piston is in the top dead center position 84.

An optical glow plug 202 (FIG. 8) may be inserted into the engine block 38 in place of the standard glow plug 72. Unlike the glow plug 72, however, the optical glow plug 202 includes a threaded shell 204. However, the threaded shell 204 includes a quartz rod 206 extending through it. When the fuel within the cylinder 60 ignites (see FIG. 4C) a flash of light is emitted. The light travels through the quartz rod 206 and may be detected outside of the engine 36.

The optical pickup 198 is sensitive to light and attaches onto the optical glow plug 202. The optical pickup 198 provides an electric light signal to the display 34 upon sensing the light coming through the quartz rod 206 from the internal chamber 54 of the engine 36.

As described in the detailed discussion of the processing circuit 42, the display 34 receives the top dead center signal and light signal which represent, respectively, when the piston 62 reaches the top dead center position 84 and when ignition of the fuel mixture occurs within the cylinder 60. As a result, the display 34 may determine whether the timing of the engine 36 is proper. That is, the display 34 may evaluate whether the piston 62 is in a proper position when the fuel injector 70 passes the combustible fuel mixture into the hot cylinder 60 and ignition occurs.

Of course, timing may also be checked in a conventional manner. Thus, when the display 34 senses that ignition in a predetermined cylinder has occurred, the display 34 provides a signal to the strobe output 200. The strobe output 200 then provides a bright flash of light. By pointing the strobe output 200 at the flywheel 156, the mechanic can then determine how a mark (not shown) on the flywheel 156 aligns with a mark (not shown) on the block 46 when the flash of light occurs. Typically, if the two marks bear a particular, predetermined relation with each other during the flash of light, the engine 36 is properly timed.

In another embodiment of the present invention, an injection sensor (not shown), attached directly to the fuel injector 70, is used instead of the optical pickup 198. The injector sensor then provides an electric injection signal whenever the fuel injector 70 operates and injects fuel into the cylinder 60.

Alternatively, the present invention may use a liquid pressure sensor (not shown) rather than the light sensor. As shown in FIG. 5, the fuel is delivered, under pressure, to the fuel injector 70 via a fuel intake line 208. When the injector 70 squirts fuel into the internal chamber 54, the pressure of fuel within the intake line 208 temporarily decreases.

Notably, not all fuel that passes through the intake line 208 into the injector 70 is delivered to the internal chamber 54. A small portion of the fuel circulates inside of the injector 70, in order to cool and lubricate it, and then escapes via one or more fuel return lines 210.

The liquid pressure sensor is placed in contact with the fuel inside of the intake line 208. When the injector 70 operates and the pressure of the fuel temporarily decreases, the liquid pressure sensor emits a direct fuel line pressure signal. This signal may be received by the display 34 instead of the light signal and allow the timing of the engine 36 to be tested.

In yet another variation of the present invention, a clamp-on pressure sensor (not shown) is used instead of the optical pickup 198. As the pressure of the fuel within the intake line 208 decreases and then increases, the outside diameter of the intake fuel line 208 decreases and then increases. A contraction of the outside diameter signals that the pressure inside the intake line 208 has decreased and that the injector 70 is squirting fuel into the internal chamber 54 for ignition. The clamp-on pressure sensor detects such a decrease and responsively provides an indirect intake fuel line pressure signal. This signal may then be used by the display 34, just as the light signal is used, in order to check the timing of the engine 36.

As another alternative, a temperature sensor having an extremely short response time may be used, as previously discussed, to provide a signal when the temperature of the vapor within the internal chamber 54 increases drastically. Such an increase in temperature represents the firing of the combustible fuel mixture. Thus, the signal from the temperature sensor, like the light signal, could be used to determine whether the engine 36 is timed correctly.

In another form of the present invention, no optical pickup 198 is provided. Instead, the timing sensor 168 includes a lateral vibration sensor 212 attached to the block 46 near the cylinder 60. The vibration sensor 212 is tuned to emit an electrical signal in response to vibrations in the block 46 having a frequency between 15,000 and 18,000 hertz.

The present inventors have observed that the ignition and expansion of vapor within the cylinder 60 causes a significant vibration of such a frequency. Thus, the vibration sensor 212, like the optical pickup 198, transmits an electrical signal to the display 34 when combustion occurs with the cylinder 60.

The current sensor 170 used with the system 30 clamps over any wire on the engine 36 and senses the electromagnetic field generated by current flowing through the wire. In FIG. 3, for example a suitable wire 214 is shown for transmitting current between the battery 50 and electric starting motor 52.

The current sensor 170 produces an electric signal representative of the current, and the electric signal is modified by the processing circuit 42. The value of the current is then represented on the display panels 44. The current sensor 170 may be used to monitor, for example, current flowing into the starting motor 52 while the engine 36 is in a cranking state.

The exhaust sensor 172 performs the well-known function of sensing the opacity of a particle-filled vapor (not shown). The exhaust sensor 172 includes the light emitter 216 with a known power level and light detector 218. The particle-filled vapor is allowed to pass between the light emitter 216 and light detector 218. If many particles are present and the light is deflected or absorbed by the particles, the light detector 218 detects a decrease in the light it receives. Conversely, a reduction in the particles causes an increase in light perceived by the light detector 218. The level of light detected by the light detector 218 is thus directly related to the opacity of the vapor.

As a result, the exhaust sensor 172 may provide an electric signal to the display 42 representative of the level opacity of a vapor. The result is then represented on the display panels 42.

The engine 36 includes an exhaust pipe 220 having an end 222 to direct exhaust gases (not shown) away from the engine 36 after they are expelled from the cylinder 60. (FIG. 2). If the exhaust sensor 172 is placed over the end 222 of the exhaust pipe 220, the exhaust sensor 172 will detect how opaque the exhaust gases are and thus allow a mechanic to learn from the display panels 42 how completely the combustible fuel mixture is being burned inside the cylinder 62.

The pressure sensor 172 has outside and inside ends 224, 226, and detects any force applied to the inside end 226. The pressure sensor 174 provides an electrical signal to the display 34 that represents this force. The pressure sensor 174 may be interconnected to the fuel intake line 208, for example, to determine how effectively the fuel is being pushed to the cylinder 60.

The temperature sensor 176 includes a magnetic collar 228 and thermocouple 230. The thermocouple 230 provides an electric signal to the display 34 representative of temperature. The magnetic collar 228 is attached to the thermocouple 230 and readily adheres to any ferrous material, such as the block 46, holding the thermocouple 230 closely to the surface. Thus, the temperature sensor 176 may conveniently be attached to the block 46 simply by bringing it near the block 46. An electric signal may easily be provided to the display 34 in order to cause the display panels 44 to inform the mechanic whether the engine 36 is operating at a proper temperature.

The voltage sensor 178, like each of the glow plug attachments 88–100, includes two alligator clips 232, 234 which may easily be attached to a variety of protrusions on the engine 36. The processing circuit 42 acts as a volt meter such that a signal is provided to the display panels 44 that represents the voltage between the two clips 232, 234. Thus, for example, a mechanic could apply the two clips 232, 234 to terminals on the starting motor 52 and determine whether the starting motor 52 was being provided with an adequate voltage.

Finally, the oxygen sensor 180 includes a standard detector of oxygen gas content, such as the A4 polarographic electrochemical oxygen sensor manufactured by Teledyne Analytical Instruments. A useful oxygen sensor is also described in U.S. Pat. No. 4,077,861.

The oxygen sensor 180 provides an electric signal to the display 44 representative of the oxygen content of sampled vapor. The oxygen sensor 180 includes an oxygen sensor sample tube 236 that may be placed in end 222 of the exhaust pipe 220. The oxygen sensor 180 then receives exhaust gases through the tube 238 and provides an electric signal to the display 34 representative of the oxygen content of the exhaust gases.

In addition, the high response thermocouple 166 may be used substantially simultaneously with the oxygen sensor 180 in order to provide an instantaneous peak temperature signal representative of the peak temperature within the internal chamber 54 during combustion of the fuel mixture. In one embodiment of the present invention, the processing circuitry 112 combines the signals from the oxygen sensor 180 and thermocouple according to the nomogram (shown in FIG. 10).

The nomogram may easily be used by referring to scale A for peak cylinder temperature and scales B and C for oxygen content. Thus, for example, assume that a cylinder in an engine (not shown) exhibits a peak temperature of 2,000° centigrade and causes an exhaust having an oxygen content of 12%. In this case, one must look to the 2,000° mark on the A scale and the 12% mark on the B scale. One can then draw a straight line between these two marks and extend the line over the 12% section of the C scale. By then looking down the 12% section of the C scale, one notes that the line intersects the 12% section at the 360 hash mark, about halfway between the 0 and 750 hash marks. Thus, one can see that the cylinder is producing the equivalent of approximately 360 parts per million of nitrogen oxides.

In this manner, the display 34 arrives at an approximation (or equivalent) of the level of nitrogen oxides (NOX) within the exhaust gases. The processing circuit 42 then provides a signal representative of the nitrogen oxide content to the display panels 44. Thus, a digital representation of the NOX content signal is set out for the mechanic to observe. In this way, the mechanic may determine how many pollutants are being produced by the engine 36.

Of course, many other types of sensors may be used with the present invention. For example, a flow meter (not shown) may be attached to the fuel intake line 208 and fuel return lines 210. These flow meters may give a fuel intake signal and fuel return signal which represent, respectively, the amount of fuel flowing into and away from the injector 70. The display 34 may then subtract the rate that fuel is flowing away from the injector 70 from the rate the fuel is flowing toward the injector 70 in order to determine a net fuel consumption rate. A digital representative of this net fuel consumption rate may then be displayed on the display panels 44.

The power leads 184 include two alligator clips 238, 240. The power leads 184 attach to the electric battery 50 and provide power for the processing circuit 42 and display panels 44 to operate.

OVERVIEW OF PROCESSING CIRCUITRY

Figure 10B:
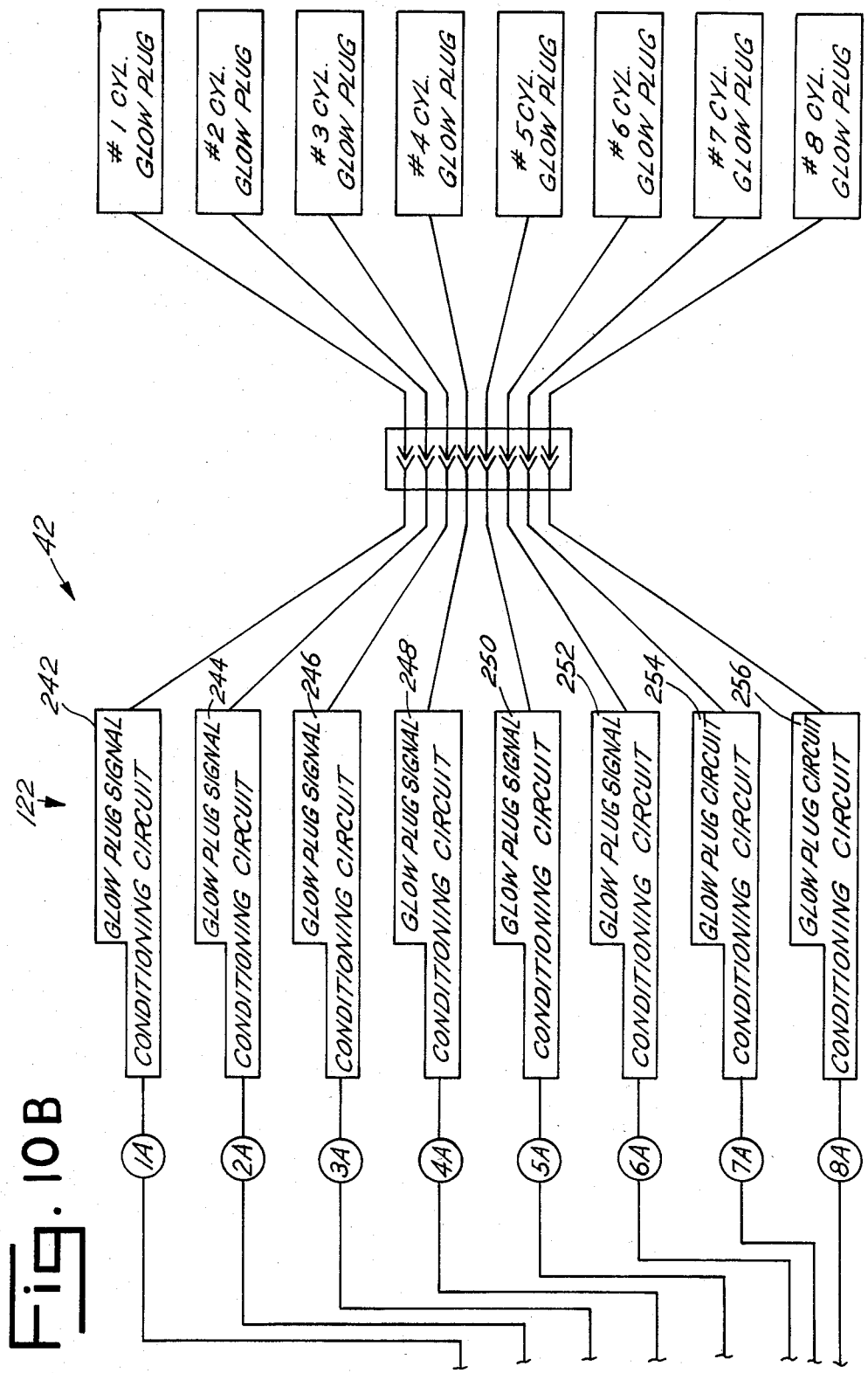
FIGS. 10A-10C are a series of block diagrams of the invention of FIG. 1.

As shown in FIGS. 10A-10C, the processing circuit 42 includes eight identical glow plug signal conditioning circuits 242, 244, 246, 248, 250, 252, 256, a selection circuit 258, eight identical peak hold circuits 260, 262, 264, 266, 268, 270, 272, 274, eight display driver circuits, 276, 278, 280, 282, 284, 286, 288, 290, and eight identical digital read outs 292, 294, 296, 298, 300, 302, 304, 306, and a series of adjustable, manual inputs 308 (FIG. 1).

Signals are transmitted by the glow plug attachments 86-100 and active sensors 102 to the selection circuit 258. As shown in FIG. 1, the manual inputs 308 may be externally adjusted. Such adjustment may inform the selection circuit 258 which eight pieces of information the mechanic wishes to have displayed on the eight digital read outs 292-306. The selection circuit 258 will allow only the signals from the eight selected sensors to pass on to the peak hold circuits 260-74.

The peak hold circuits 260-74 are also interconnected to the manual inputs 308. By adjusting the manual inputs 308, the mechanic may inform each of the peak hold circuits 260-74 whether maximum or present values should be displayed.

The peak hold circuits 260-74 accordingly provide peak signals to the display drivers 276-90. These signals represent, respectively, (1) the maximum value for an engine attribute that a particular sensor has detected since a corresponding manual input 308 was turned to "peak" or (2) the present value for an engine attribute that a sensor detects. The signal from each peak hold circuit 260-74 is transmitted to one of the display drivers 276-90.

Each of the display drivers 276-90 receives a signal from one of the peak hold circuits 260-74 and converts it to a digital signal. The digital signal is then received by one of the digital read outs 292-306.

From these digital read outs 292-306, the mechanic may discern attributes of the engine 36. By then comparing the actual operating attributes with normative values, he may more easily discern the location of any fault within the engine 36.

DETAILED DESCRIPTION OF PROCESSING CIRCUITRY

Glow Plug Signal Conditioning Circuits 242-56

Figure 11A:
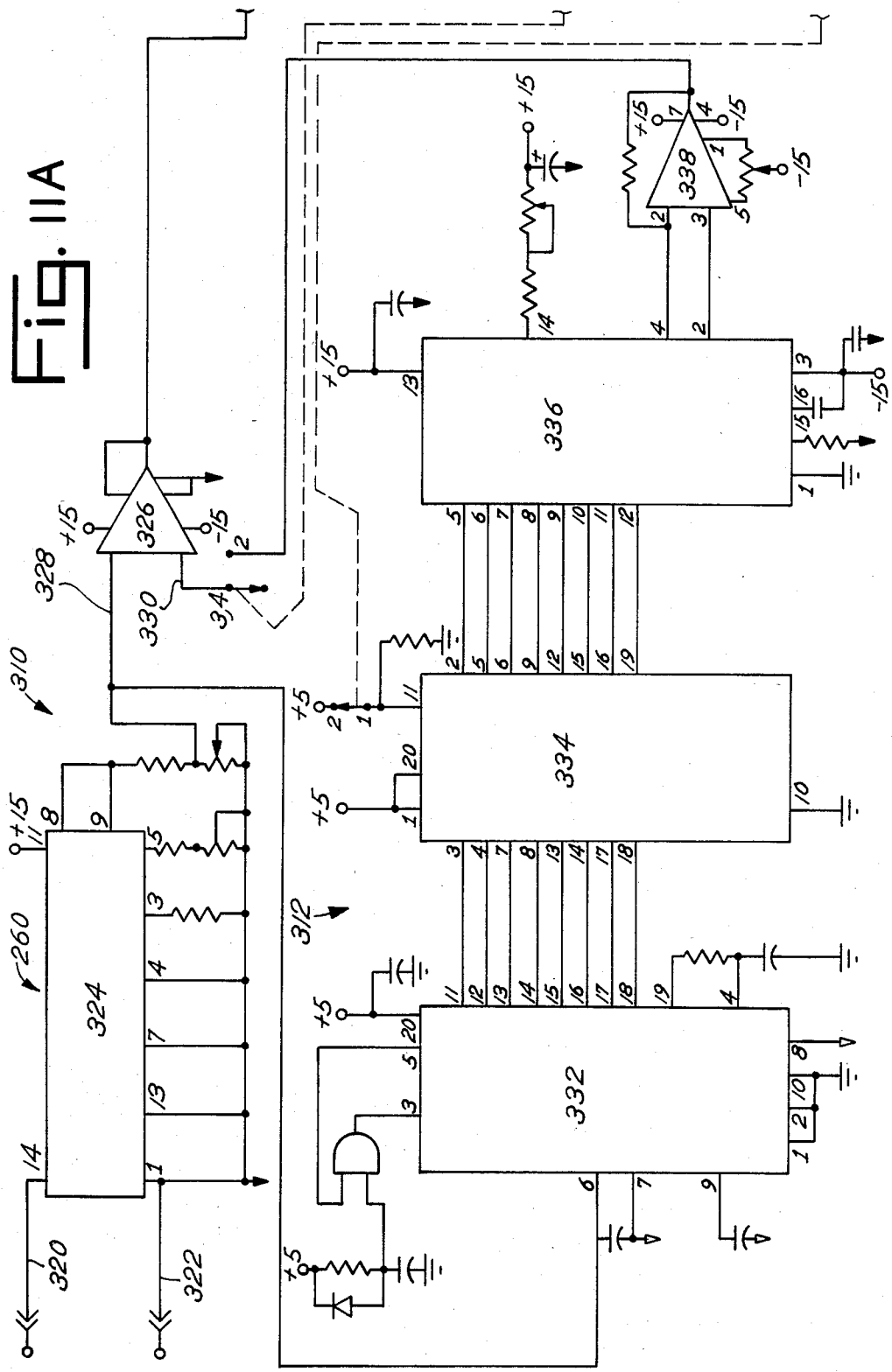
FIGS. 11A-11B are a series of schematic diagrams of a glow plug signal conditioning circuit within the invention of FIG. 1.
Figure 11B:
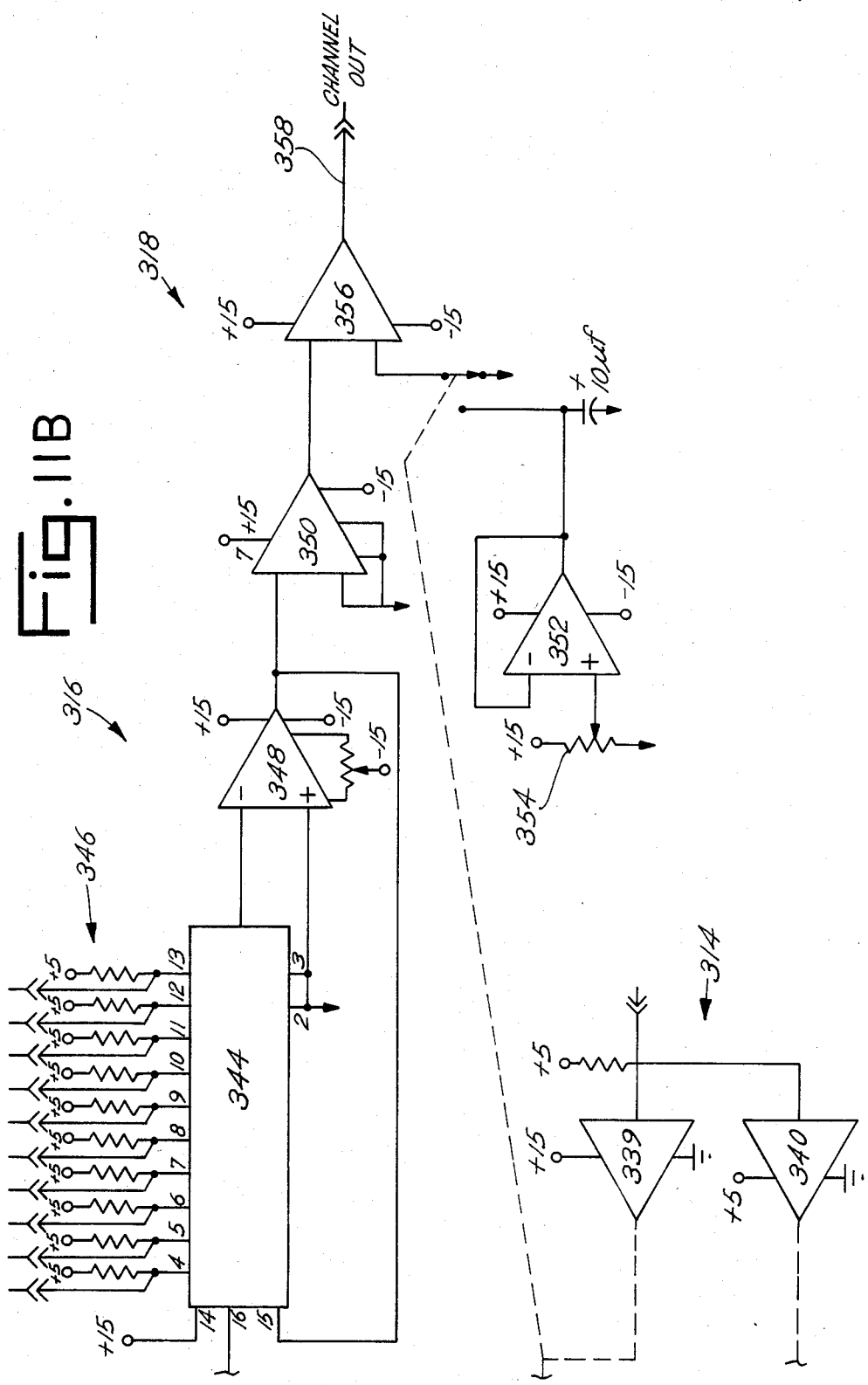

Since all of the glow plug signal conditioning circuits 242-56 are identical, only one glow plug signal conditioning circuit 242 is described for illustrative purposes. As shown in FIGS. 11A-11B, the signal conditioning circuit 242 includes amplifying circuitry 310, calibration circuitry 312, switching circuitry 314, gain set circuitry 316, and scaling circuitry 318.

The amplifying circuitry 310 includes two input leads 320, 322, an integrated millivolt amplifier 324, and a differential operational amplifier 326 having first and second leads 328, 330. In one embodiment, the millivolt amplifier 324 is an AD594 chip, manufactured by Analog Devices, Inc. The differential operational amplifier 326 is a 3627 chip, made by Bur-Brown, Inc.

In this detailed discussion of the processing circuit 42, most, if not all, of the electrical components described are available from more than one manufacturer. However, the name of one supplier for major components is provided as an additional aid to the reader.

The two input leads 320, 322 receive an analog voltage signal from the glow plug 72. The voltage signal is received by the millivolt amplifier 324 and amplified. The millivolt amplifier 324 then responsively transmits an amplified glow plug signal to both the first amplifier lead 328 and the calibration circuitry 212.

The calibration circuitry 312 includes an analog to digital (a to d) converter 332 (ADC0804 chip made by National Semiconductor, Inc.), octal latch 334 (74C374 chip made by National Semiconductor, Inc.), digital to analog (d to a) converter 336 (DAC0800 chip made by National Semiconductor, Inc.), and operational amplifier 338 (TL081 chip made by Texas Instruments, Inc.). The a to d converter 332 receives the amplified glow plug signal, converts it to a specific digital word, and transmits the digital word to the octal latch 334.

The octal latch 334 maintains the digital word and, on command, transmits the word to the d to a converter 336. The d to a converter 336 converts the word received from the octal latch 334 to an analog signal. The analog signal is amplified by the operational amplifier 338 and transmitted to the second lead 330 of the differential operational amplifier 326.

The switching circuitry 314 includes two CMOS switches 339, 340 (DG303 chip made by Siliconix, Inc. and a CD4016 chip made by National Semiconductor, Inc.) (FIG. 12B). The manual inputs 308 and CMOS switches 339, 340 are interconnectd so that an operator of the system 30 may manually activate the CMOS switches 339, 340. When activated, the octal latch 334 receives the command to store the digital word received from the a to d converter 332.

The switches 339, 340 are normally activatd after the engine 36 has been in a running state, allowed to warm up to its normal operating temperature, and then stopped. Under such circumstances, the temperature of the vapor within each cylinder 60 of the engine 36 should be approximately the same.

Although the voltage signals produced by all glow plugs in the engine 36 will also be approximately the same, a glow plug-to-glow plug variation may exist such that each of the glow plug signal conditioning circuits 242–56 receives a noticeably different voltage signal.

The word stored in the octal latch 334 of each of the glow plug signal conditioning circuits 242–56 represents how one particular glow plug 72 responds to a certain temperature. Thus, by transmitting an analog signal corresponding to this number to the second lead 330 of the differential operational amplifier 326, much of the glow plug-to-plug variation is eliminated when the amplified glow plug signal is later transmitted to the first lead 328 of the differential operational amplifier 326.

The output of the differential operational amplifier 326 is transmitted to the gain set circuitry 316. The gain set circuitry 316 includes a thumbwheel 342 (FIGS. 1 and 11B), digital multiplier 344 (DAC1020 chip made by National Semiconductor, Inc.), a series of ten current limiting resistors 346 interconnecting the thumbwheel 342 and digital multiplier 344, a buffer amplifier 348 (TL081 chip made by Texas Instruments, Inc.), and a unity gain inverting amplifier 350.

The multiplier 344 receives the output of the differential operational amplifier 326 and amplifies it to an appropriate amount for the glow plug being used in the analysis of the diesel engine 36. An operator informs the multiplier 344 of the type of glow plug 72 being used by adjusting the thumbwheel 342 and thereby adjusting the gain of the multiplier 344.

The thumbwheel 342 in the preferred embodiment is made by the Digitron Co. of Pasadena, Calif., and it accepts three different, hexidecimal inputs. The proper settings of the thumbwheel 342, and corresponding proper gain of the multiplier 344, for four different types of commonly-used glow plugs are set out below.

| Glowplug Type | Thumbwheel Setting | Corresponding Gain of the Multiplier 316 |
| --- | --- | --- |
| General Motors | 2A7 | 9.64 |
| Volkswagen | 00A | 1.45 |
| Toyo Kogyo | 2B8 | 2.23 |
| Isuzu | 305 | 2.69 |

Of course, proper settings of the thumbweel for other types of glow plugs may be easily be obtained by empirical testing.

The output of the multiplier 344 is inverted by the buffer amplifier 348 (in order to provide negative feedback to the multiplier 344) and inverted again by the inverting amplifier 350. The inverting amplifier 350 then provides a raw data signal to the scaling circuitry 318.

The scaling circuitry 318 includes a buffer amplifier 352 (LM310 chip made by National Semiconductor, Inc.), variable resistor 354, summing amplifier 356 (3627 chip made by Bur-Brown, Inc.), and output lead 358. Under typical testing conditions, the raw data input is passed on to the selection circuit 258 by the summing amplifier 356.

However, when the scaling circuitry 318 is activated and the glow plug output is being normalized, the temperature of the diesel engine 36 and vapor within the diesel engine is generally known. (Typically, it lies within the range of 82° to 93° centigrade.)

By adjusting the variable resistor 354 during the calibration procedure, the inputs to the buffer amplifier 352 and summing amplifier 356 are changed. Thus, the operator may easily adjust the variable resistor 354 to ensure that the display panels 44 accurately reflect the known temperature during the calibration procedure. Consequently, the conditioning circuit 242 will properly amplify the signal from the glow plug 72 when the temperature changes and the system 30 is no longer being calibrated.

SELECTION CIRCUIT 258

Figure 10:
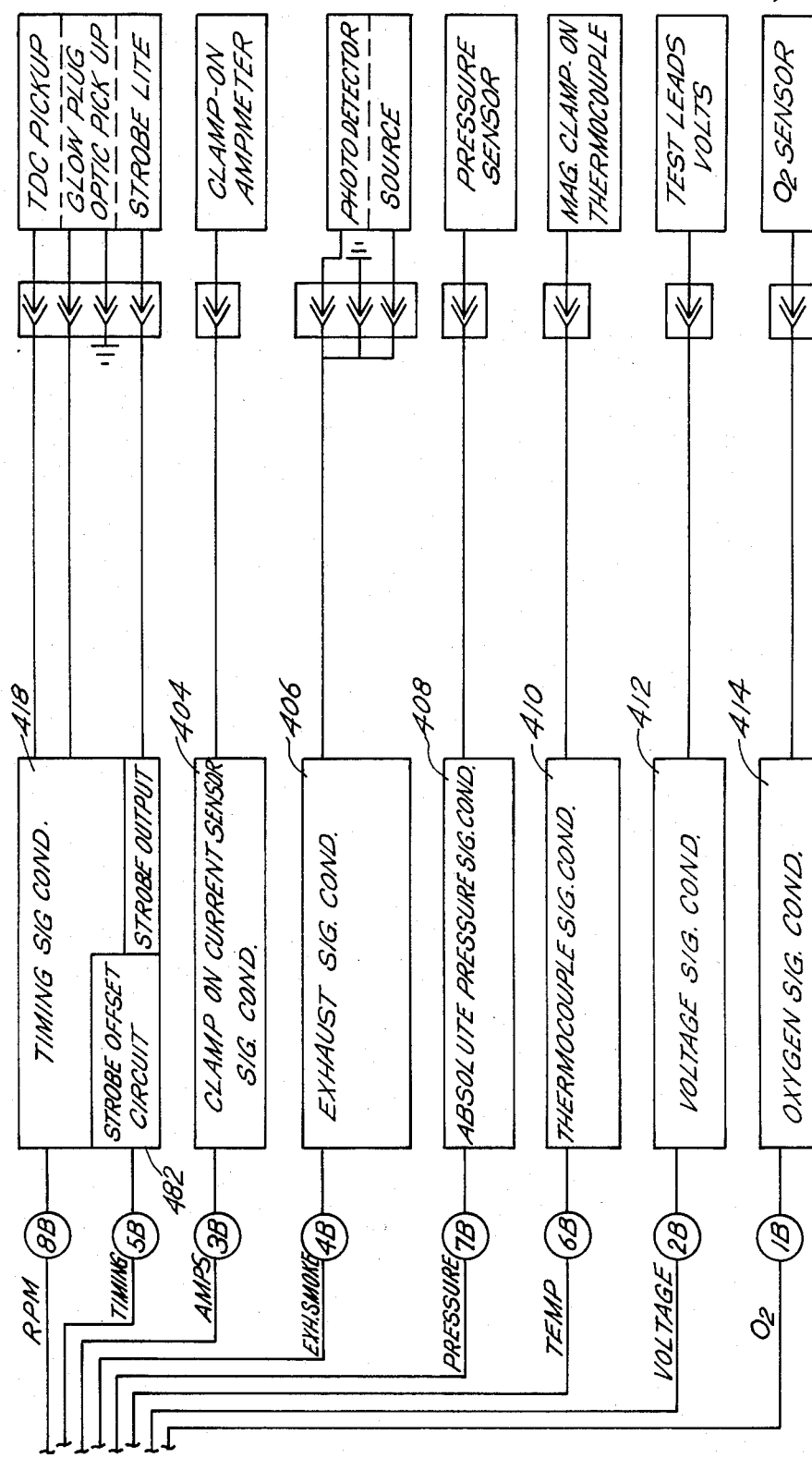
Figure 12:
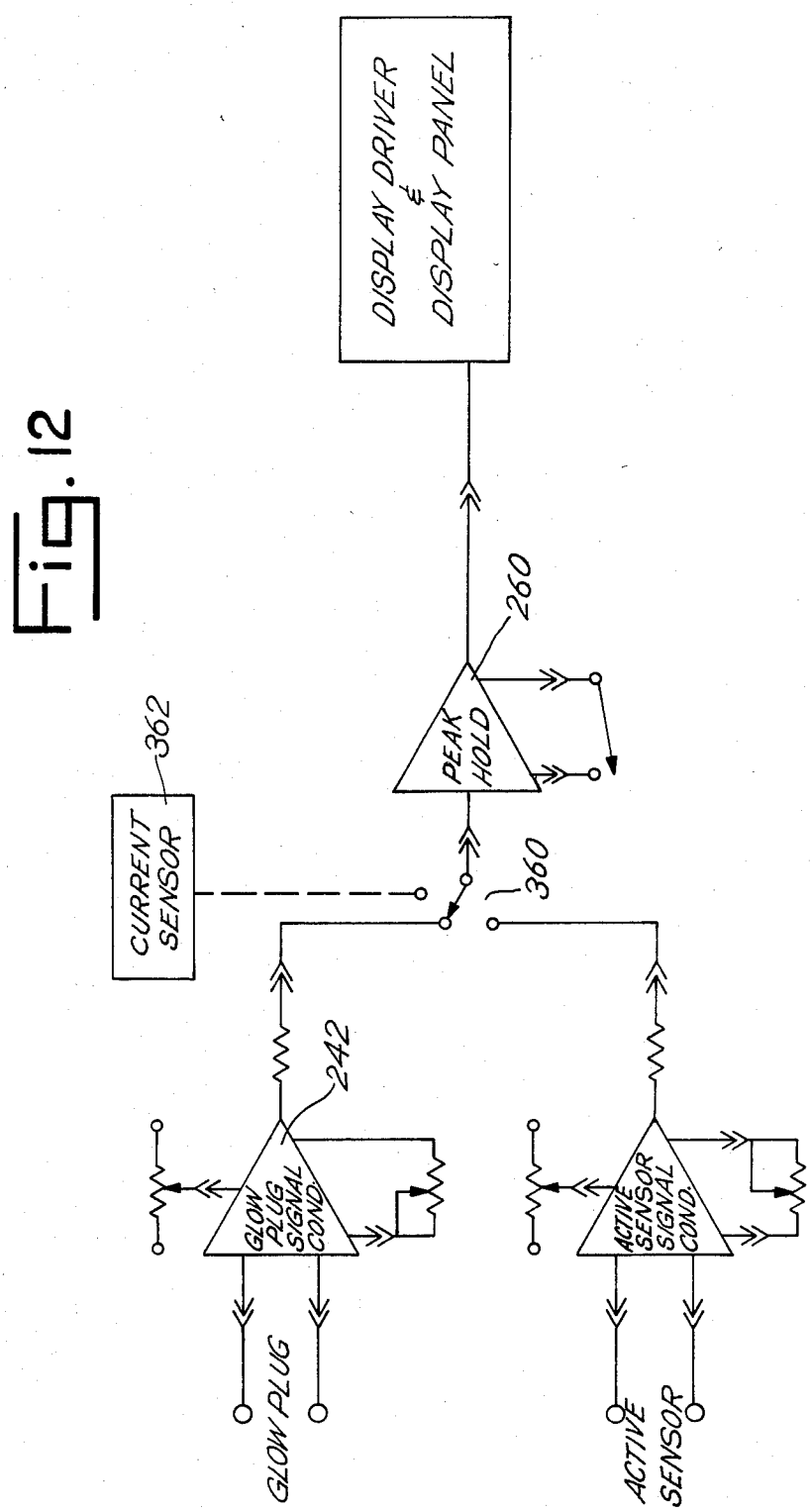
FIG. 12 is a block diagram showing the operation of a selection circuit within the invention of FIG. 1.

As shown in FIGS. 10 and 12, the selection circuit 258 consists of eight switches 360. These switches allow the operator to select the output of up to eight sensors 86–102 to be presented on the display panels 44.

A block diagram setting out how one of the switches 360 diverts signals to one of the peak hold circuits 260–272 is shown in FIG. 12. Note that in another embodiment of the present invention, the switch 360 allows the operator to choose other sensors than those expressly shown in FIGS. 9 and 10. Thus, the switch 360 may, for example, interconnect the display panels 44 with a sensitive current sensor 362. Such current sensor 362 could provide a signal representative of the current drawn by the starting motor 52 while the engine 36 is in a cranking state. This signal could then used to determine the brake mean effective temperature of the engine 36.

Peak Hold Circuits 260-74

As shown in FIGS. 10A–10C, the signal chosen by the selection circuit 258 passes on one of the peak hold circuits 260–74. Since all eight peak hold circuits 260–74 are identical, only one peak hold circuit 260 is discussed for illustration.

Figure 13A:
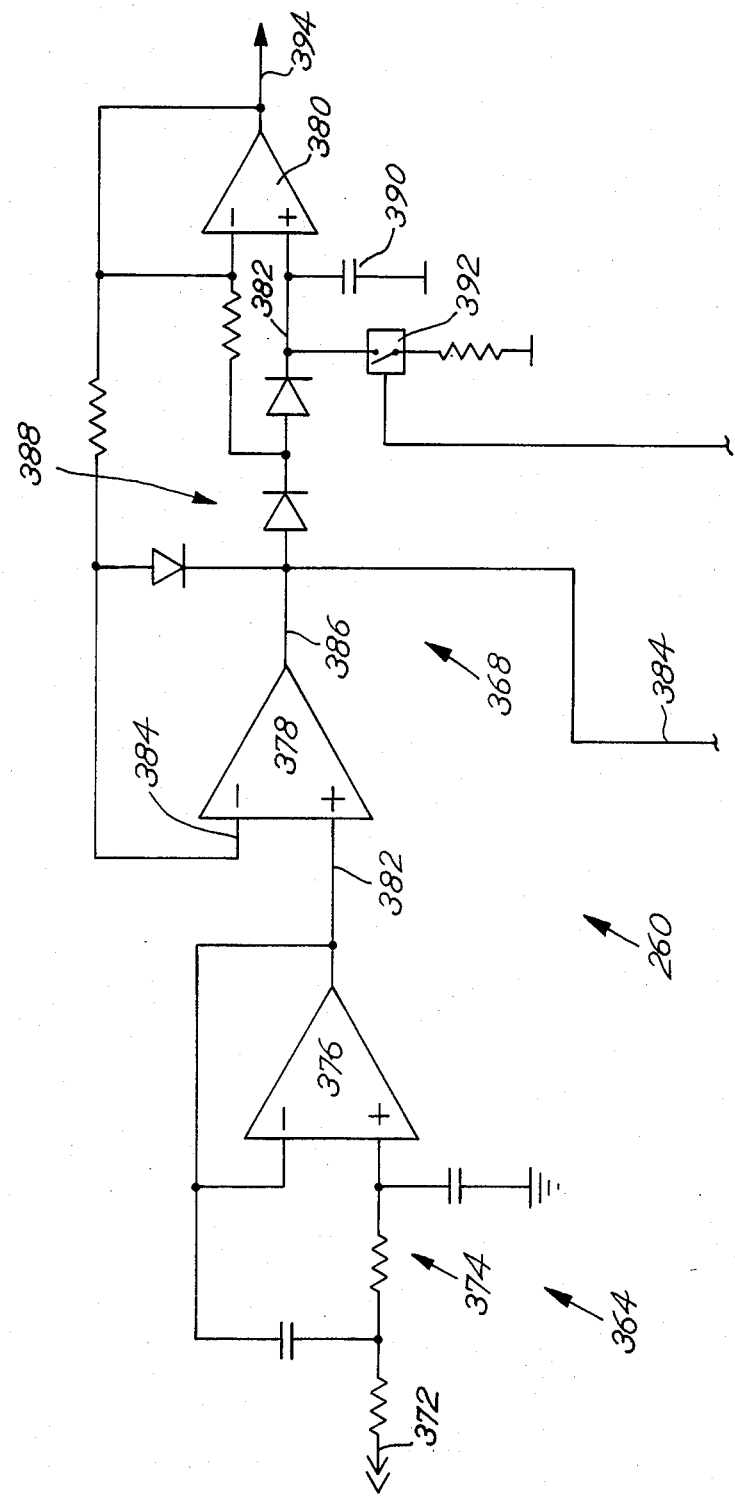
FIGS. 13A-13B are a series of schematic diagrams showing a peak hold circuit within the invention of FIG. 1.
Figure 13B:
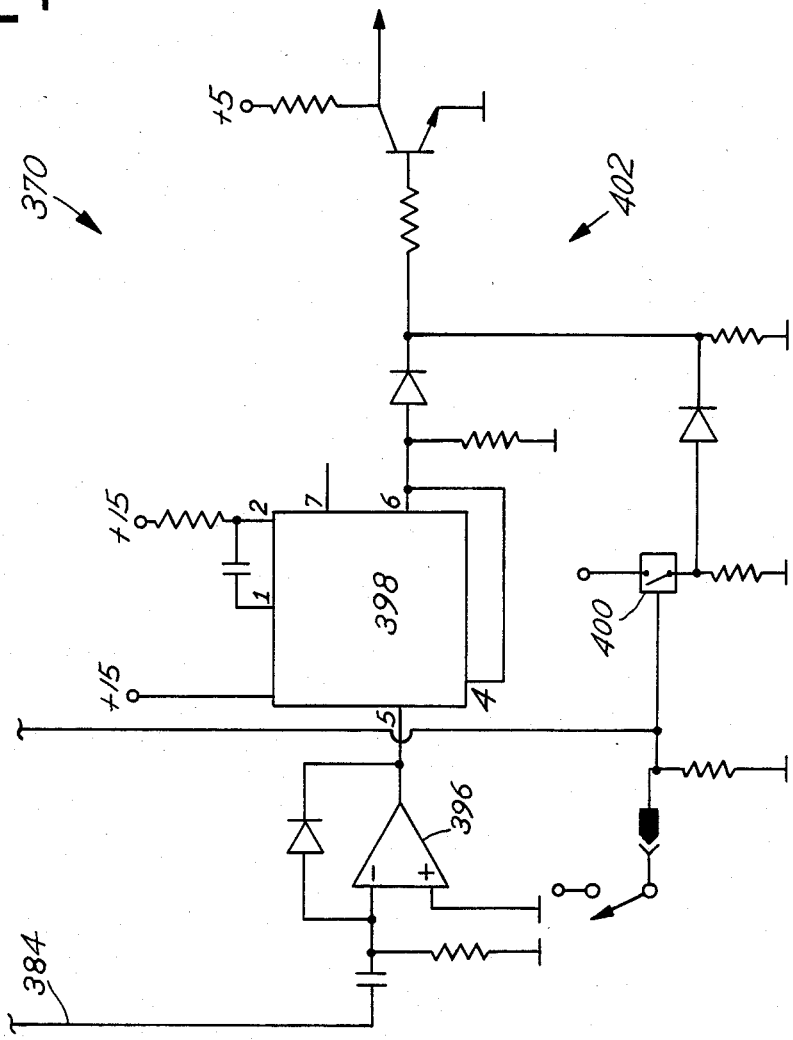

As shown in FIGS. 13A–13B, the peak hold circuit 260 includes low-pass filter 364, analog peak hold circuitry 368, and latch detect circuitry 370. The low-pass filter 364 includes an input lead 372, RC filter network 374, and voltage follower 376 (CD4016 chip made by National Semiconductor, Inc.).

The input lead 372 receives a signal from the selection circuit 258, and high frequency noise is filtered out by the RC filter network 374. The signal is then passed on to the voltage follower 376. The voltage follower 376, which has a high input impedance and low output impedance, receives the signal and responsively provides a buffered signal to the analog peak hold circuitry 368.

The analog peak hold circuitry 368 includes first and second operational amplifiers 378, 380 (CD4016 chips made by National Semiconductor, Inc.), biasing lead 382, condition lead 384, output lead 386, diodes 388, capacitor 390, switch 392 and output lead 394.

If one of the adjustable inputs 308 is changed and the switch 392 is closed, the capacitor 390 readily discharges and the buffered signal is transmitted through the first and second operational amplifiers 378, 380 to the output lead 394. This represents the status of the system 30 while in the "continual" state. Any change in a monitored attribute of the engine 36 will nearly instantaneously be shown on the display panels 44.

If the operator desires that the system 30 display only "peak", or maximum, values, he may actuate the switch 392 so that the capacitor 390 maintains any voltage applied to the output lead 386 of the first operational amplifier 376. Thus, the output of the second operational amplifier 380 will equal the highest voltage level that the capacitor 390 has reached since the switch 392 was last activated.

Moreover, when the switch 392 is open, any decreases in the voltage along the biasing lead 382 will cause a voltage spike along the condition lead 384. Thus the voltage spike is received by the latch detecting circuitry 370. The latch detecting circuitry 370 includes positive pulse differentiator 396 (CD4016 operational amplifier made by National Semiconductor, Inc.), monostable multivibrator 398 (CD4583 chip made by National Semiconductor, Inc.), switch 400 and discrete OR gate 402, interconnected as shown.

When the switches 392, 400 are open, the output lead 394 receives a continual signal. When the voltage at the biasing lead 382 decreases, the voltage spike along condition lead 384 is shaped by the positive pulse differentiator 396 and transmitted to the monostable multivibrator 398. The monostable multivibrator 398 puts out a timing pulse of approximately 1 microsecond for each voltage spike. This timing pulse is received by the logic components 402 which, in turn, either put out a large voltage (as a signal that the peak hold mode has been selected) or a low voltage (indicating that the continual mode has been selected).

Display Driver and Display Panel Circuits 276-306

Each of the display driver circuits 276-90 receives signals from the logic network 370. The analog signal from the logic network 370 is sampled every 0.1 second and digitized.

If the output of the logic network 370 indicates that the continual mode is being used, the digital value is transmitted to the display panels 44 for viewing by the operator. Alternatively, if the system is in the peak hold mode, the output of the logic network 370 so indicates, and the display drivers 276-90 only transmit a number that is the same or larger than any previous values.

Figure 14A:
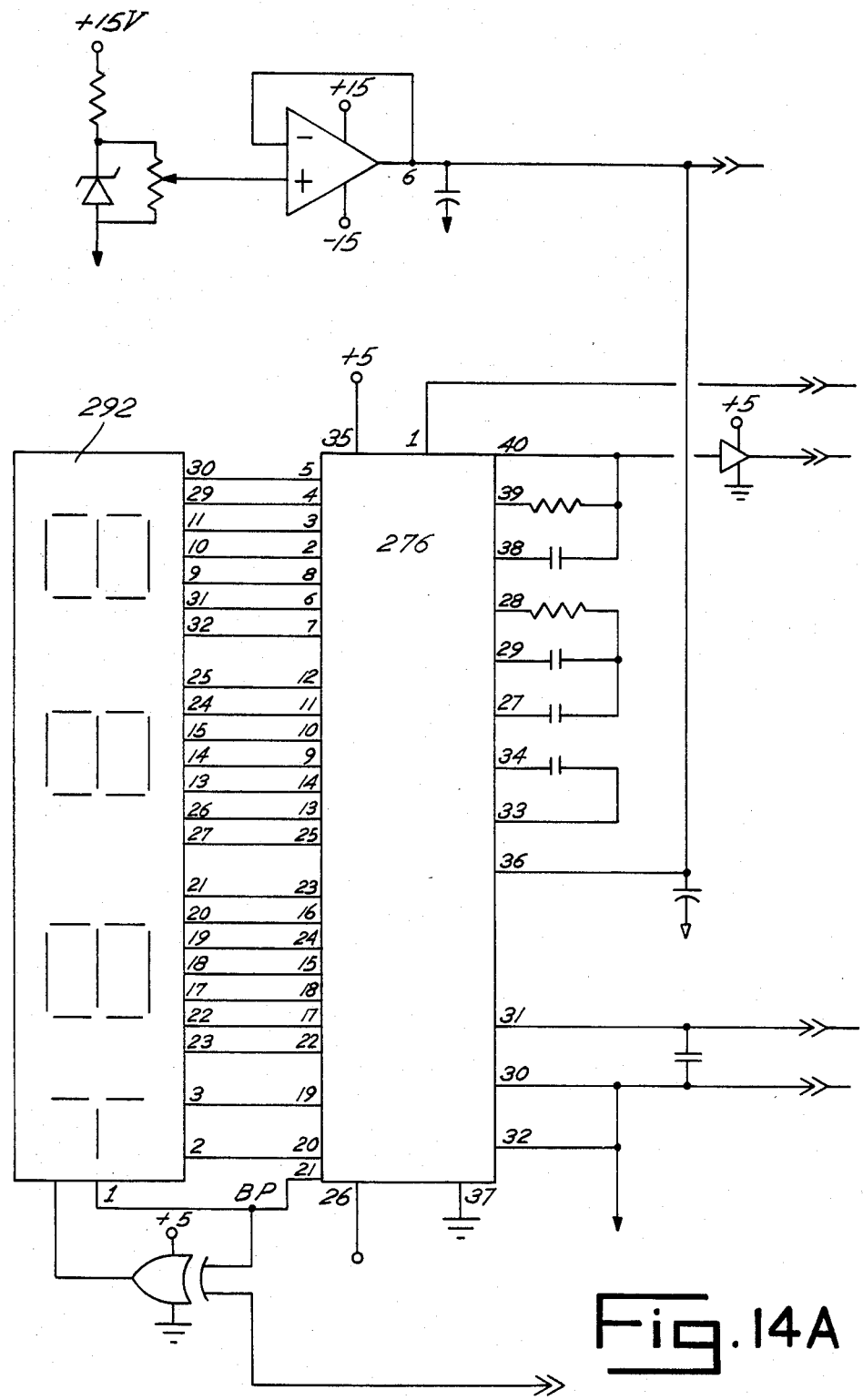
FIGS. 14A-14C are a series of schematic diagrams showing the display drivers and display readouts within the invention of FIG. 1.

In the preferred embodiment of the present invention, the display driver 276 includes an ICL7116 chip (with hold option) manufactured by Intesil Products, Inc. FIG. 14A shows the preferred connections used on the display driver for channel 1. This channel is used to display the temperature sensed by a glow plug 72 and the oxygen content sensed by the oxygen sensor 180.

Figure 14B:
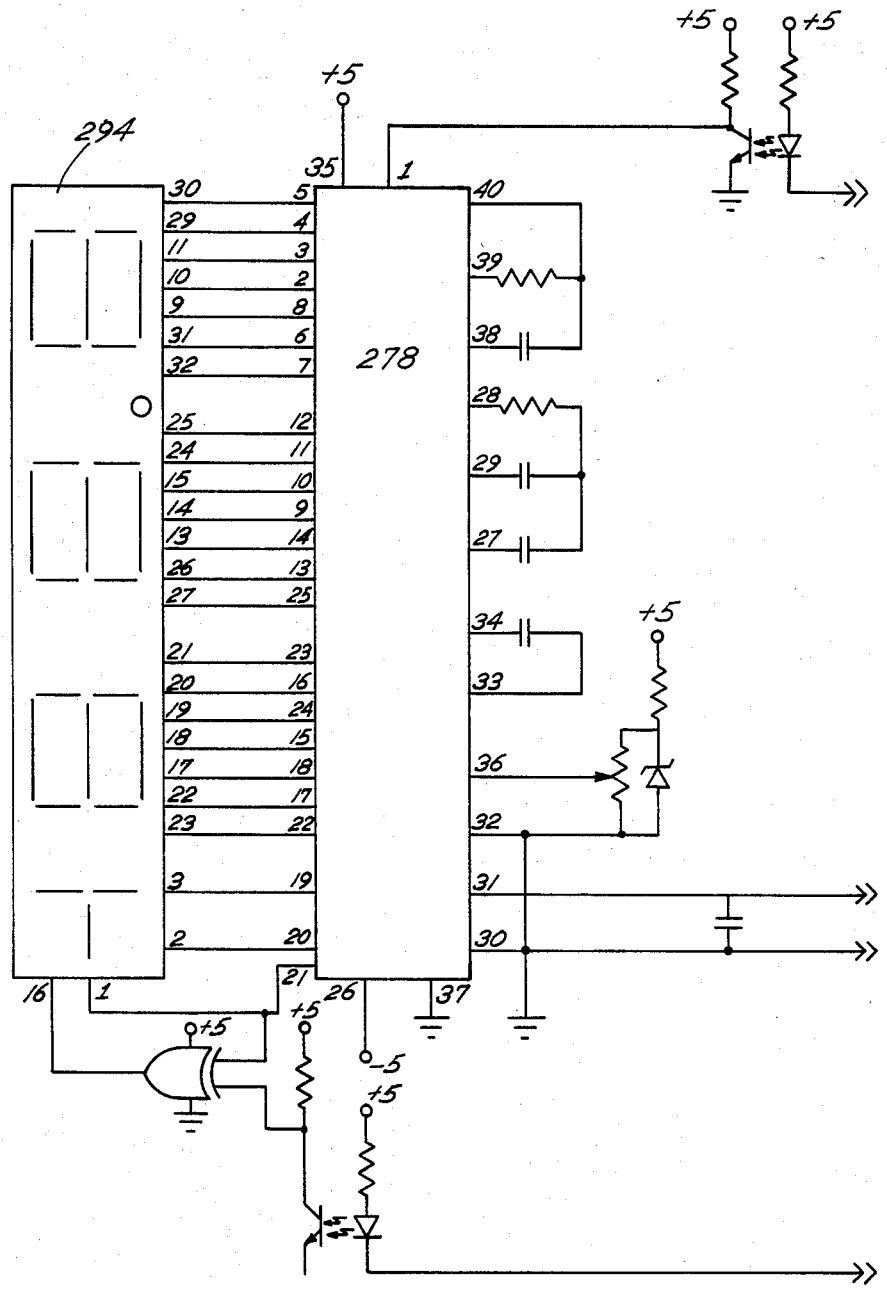

FIG. 14B shows the preferred connections used on the display driver 278 for channel 2. This channel is used to display the temperature and by a glow plug 72 and the voltage sensed by the separate voltage sensor 178.

Figure 14C:
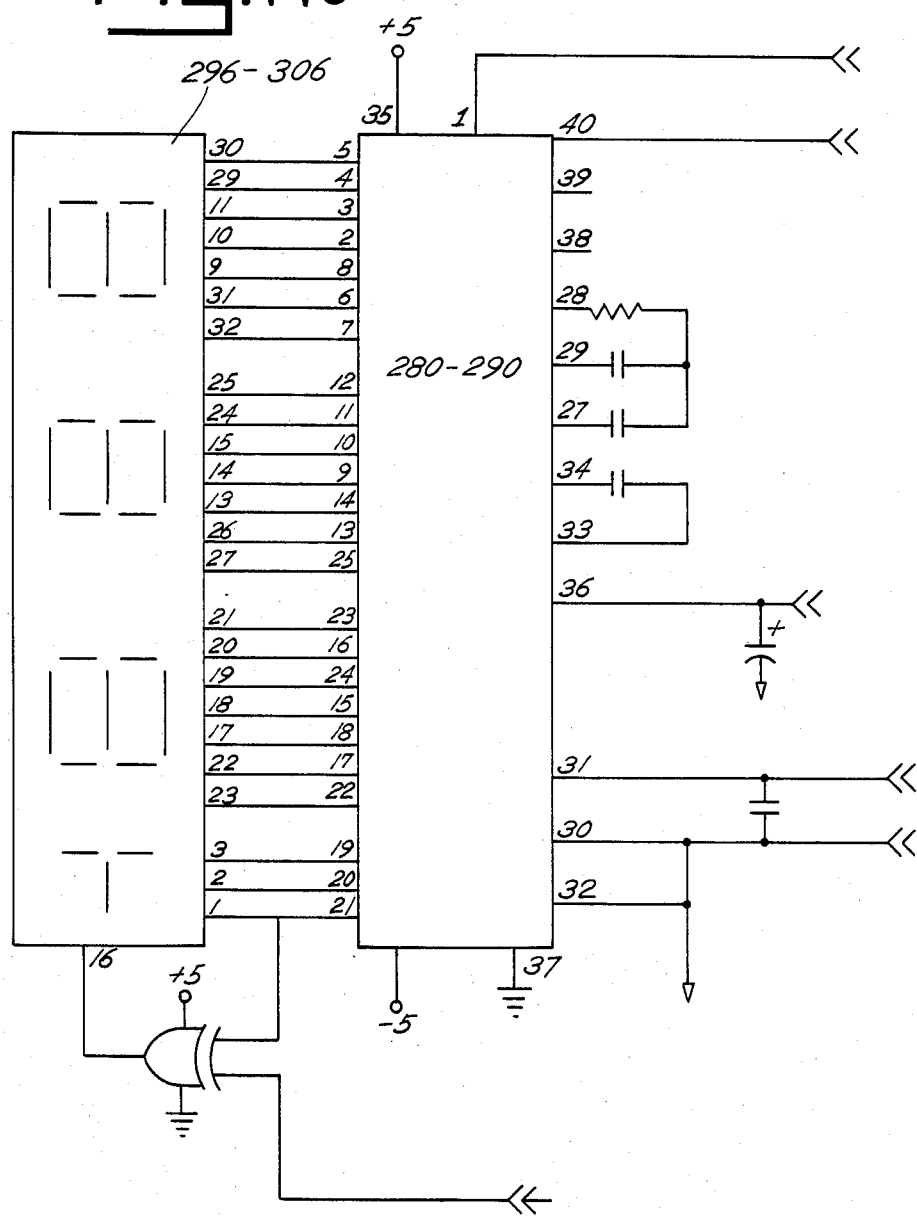

The configuration shown in FIG. 14C is used to display the temperature sensed by a glow plug 72 and the values sensed by all other active sensors used within the system 30.

The digital readouts 292-306 used in the preferred embodiment each include a 3½ digit liquid crystal display manufactured by Beckman Instruments, Inc. Note, however, that other types of displays, such as direct current gas plasma display, can also be used.

While signal conditioning circuits for the current exhaust, pressure, clamp-on thermocouple, voltage, and oxygen sensors (respectively designated as 404, 406, 408, 410, 412, and 414) are well known in the art, the signal conditioning circuit 416 for timing the engine 36 is more accurate, inexpensive, and easier to use than previous circuitry, and will be more fully described below.

Signal Conditioning Circuit for Timing 416

Figure 15A:
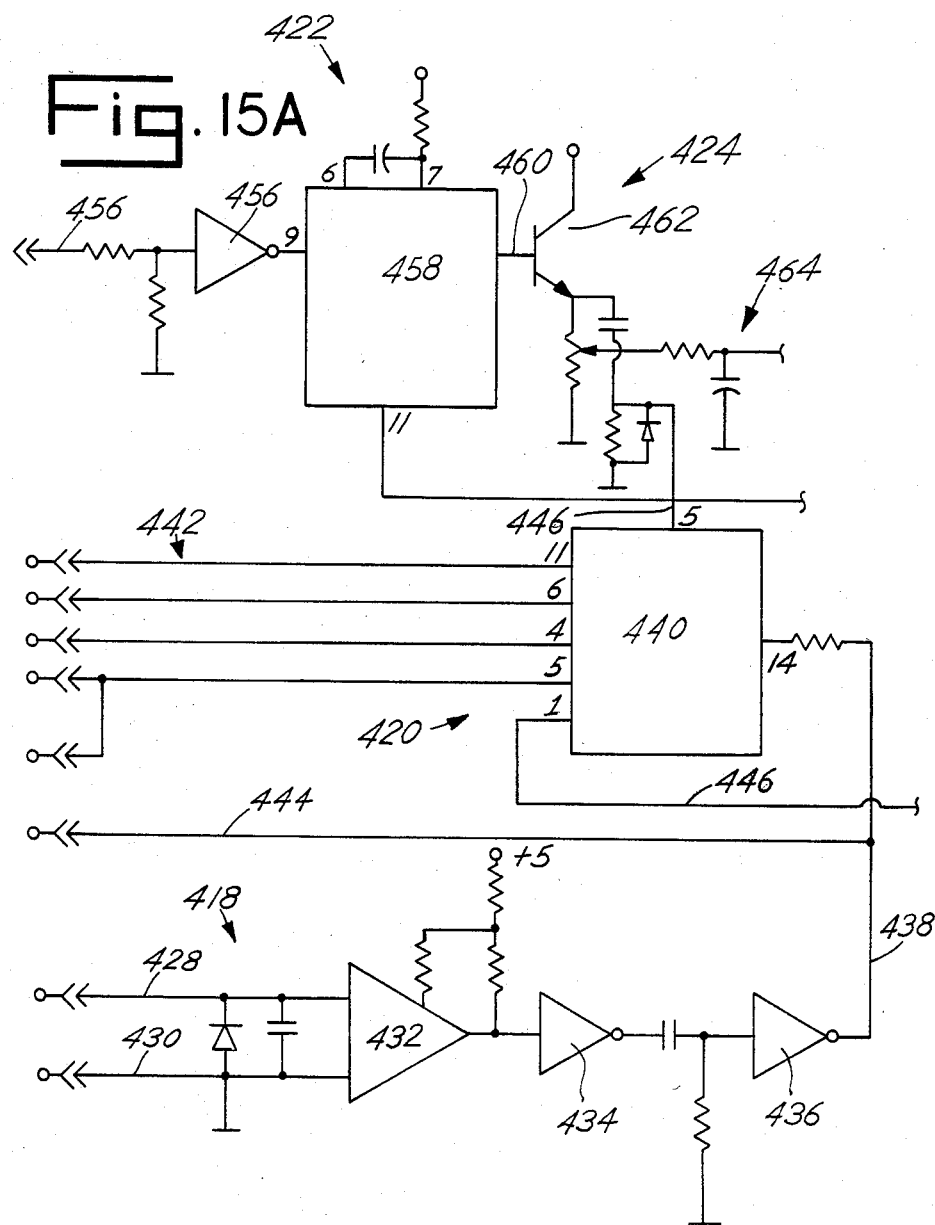
FIGS. 15A-15B are a series of schematic diagrams showing the injection timing circuit within the invention of FIG. 1.
Figure 15B:
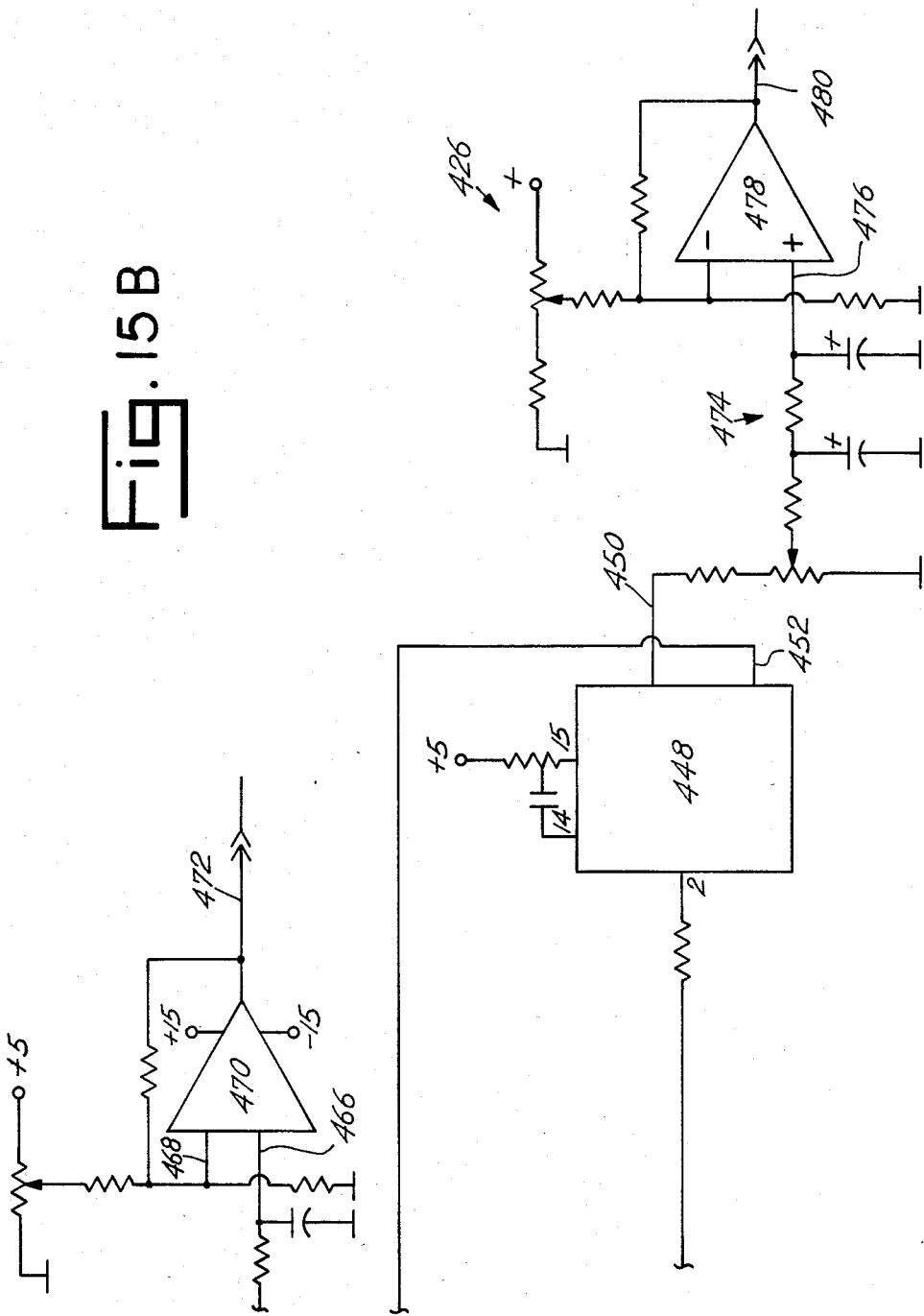

As shown in FIGS. 15A-15B, the signal conditioning circuit for timing 416 includes a revolution speed detector circuit 418, counting circuit 420, firing detector circuit 422, timing scale circuit 424, and speed scale circuit 426. The revolution speed detector circuit 418 includes positive and negative input leads 428, 430 interconnected to a comparitor 432 (LM311 chip made by Motorola Corp.), two wave shapers 434, 436 (40106 chips made by National Semiconductor, Inc), and an output lead 438.

Upon receiving a pulse from a magnetic sensor such as the top dead center pickup 196, the comparitor 432 increases the size of the signal and the two wave shapers 434, 436 convert the signal to voltage spikes. The voltage spikes are transmitted, via the output lead 438, to the counting circuit 420.

The counting circuit 420 includes a divider 440, engine type selection circuit 442, firing input lead 444, output lead 446, monostable multivibrator 448 (74C221 chip made by National Semiconductor, Inc.), and two timing leads 450, 452.

By adjusting one of the manual inputs 308 (FIG. 1), an operator may adjust the engine type selection circuit 442 for the type of signals that will be produced along the output lead 438 of the speed detector circuit 418. Thus, for example, if the pickup 196 is attached to the input lead 438 such that four voltage spikes will be produced by the wave shapers 434, 436 for each work cycle of the engine 36, the engine type selection circuit 442 may be adjusted such that the divider 440 transmits an output pulse only on every fourth voltage spike.

The divider 440 receives a firing signal from the firing detector circuit 422 via the firing input lead 444. After sensing the firing signal, the divider 440 will transmit an output pulse when it senses the next voltage spike.

The output pulse of the divider 440 is transmitted, via the output lead 446, to the monostabile multivibrator 448. Upon sensing the pulse, the monostable multivibrator 448 provides pulse, via the timing leads 450, 452 to the firing detector circuit 422 and speed scale circuit 426.

The firing detector circuit 422, which provides a firing signal, includes an input lead 456, Schmidt trigger 458 (40106 chip made by National Semiconductor, Inc.), monostable multivibrator 460 (74C221 chip made by National Semiconductor, Inc.), and output lead 462.

The input lead 456 receives an electrical signal when the photodetector 198 over the optical glow plug 202 detects a flash of light. The Schmidt trigger 456, interconnected to the input lead 456, first provides a sharp pulse upon receiving the electrical signal from the photodetector 198.

The sharp pulse is sensed by the monostable multivibrator 458, which responsively emits a high voltage along its output lead 460. The high voltage continues until the monostable multivibrator 458 receives a pulse from the divider 440 via the output lead 446. At that time, the monostable multivibrator 458 emits a low voltage along the output lead 460.

The high and low voltages along the output lead 460 are received by the timing scale circuit 424. The timing scale circuit 424 includes a switching transistor 462 (2N3567 transistor made by National Semiconductor, Inc.), RC timing network 464, positive and negative input leads 466, 468, scaling amplifier 670 (LM324 chip made by National Semiconductor, Inc.), and timing output lead 472.

Upon receiving a high voltage along the monostable multivibrator output lead 446, the switching transistor 462 turns on and allows the RC timing network 464 to charge. The voltage along the positive input lead 466 of the scaling amplifier 470 is then proportional to the time that elapses after the photodetector 198 senses the flash of combustion and the time that the pick up 196 senses the engine 36 in a predetermined position.

The voltage along the positive input lead 466 is enlarged by the scaling amplifier 470 and transmitted, via the timing output lead 472, to one of the display drivers 276-90. Accordingly, the voltage at the timing output lead 472 is proportional to the time between when combustion occurs and the piston 62 reaches a predetermined position (such as top dead center 84).

The timing pulse from the monostable multivibrator 448 is also transmitted, via the timing lead 450, to the speed scale circuit 426. The speed scale circuit 426, like the timing scale circuit 424, includes an RC timing network 474, positive input lead 476, scaling amplifier 478, and revolution speed output lead 480.

The timing signal along timing lead 450, becomes a large positive voltage for approximately 10 milliseconds after the pick up 196 detects that the piston 62 has reached a predetermined position. The more frequently that the timing pulse is a large positive voltage, the larger the voltage will be on the RC timing network 474 and positive input lead 476. The voltage of the positive lead input 476 is amplified by the scaling amplifier 478 and transmitted to the display driver via the revolution speed output lead 480.

Thus, the voltage provided to one of the display drivers 276-90 is proportional to the frequency of the timing pulse along the timing lead 444, which in turn, is proportional to how frequently the piston 62 reaches a predetermined position. Accordingly, one of the display drivers 276-90 receives a signal proportional to the speed of the engine 36.

Of course, the previously described timing circuitry can also be used with sensors other than the pick up 386. For example, timing signal conditioning circuit 418 may include a strobe offset circuit 482 such that the flash of the strobe light 440 may be adjusted to occur at variable time after the photodetector 198 senses combustion. An operator may then adjust the strobe flash to occur when, for example, a mark (not shown) on the harmonic balancer 188 of the engine 36 and a mark (not shown) on the block 38 (not shown) coincide.

An RC timing network and scaling amplifier (not shown) could then be used to provide a voltage proportional to the time between when combustion occurs and the harmonic balancer has reached a predetermined position. This voltage would then represent a timing signal to be provided to one of the display drivers 276-90. Of course, the frequency of the photodetector or strobe light could also be used as an indicator of the speed of the engine 36.

ALTERNATIVE EMBODIMENT

Figure 16B:
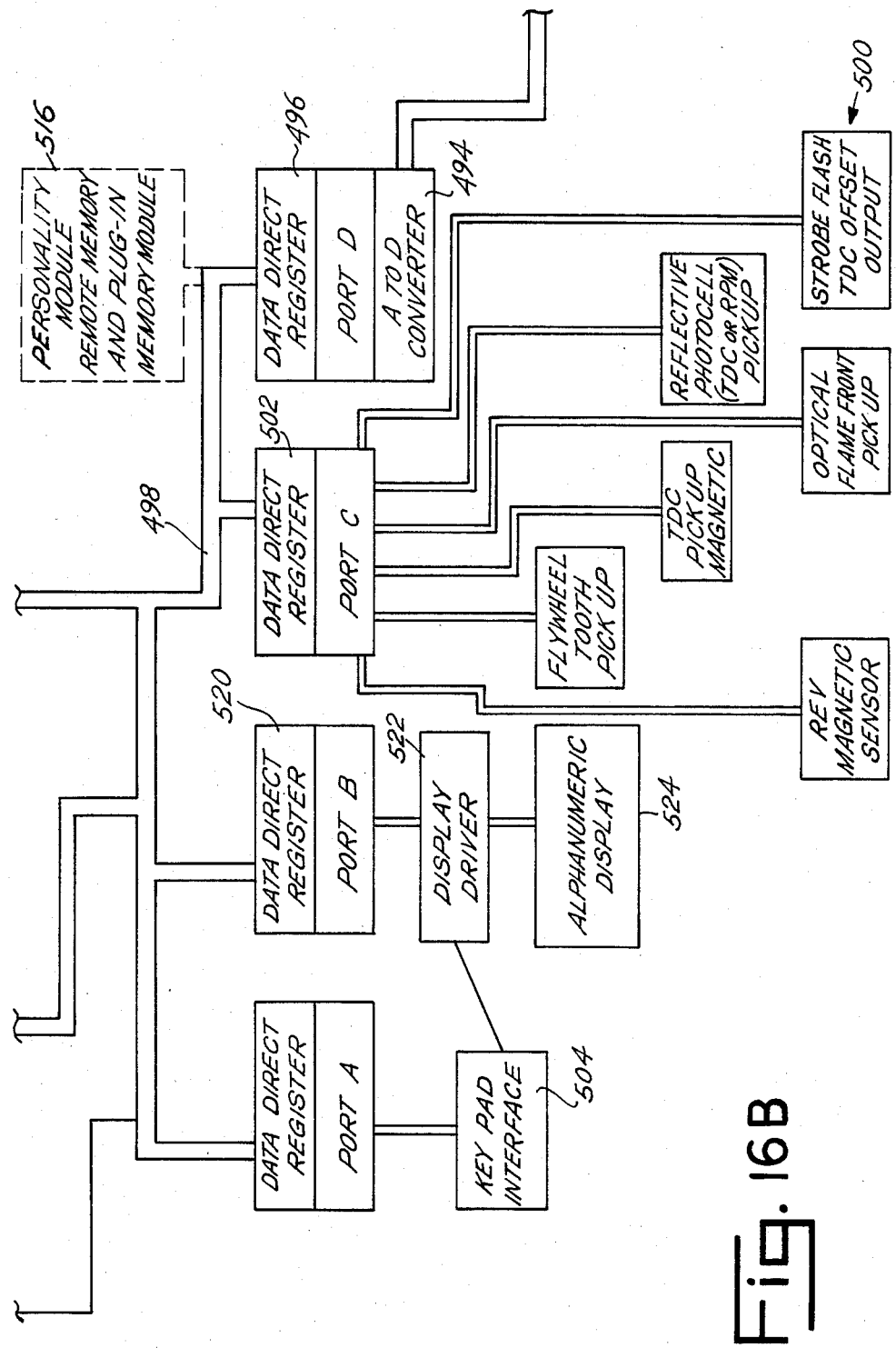
Figure 16C:
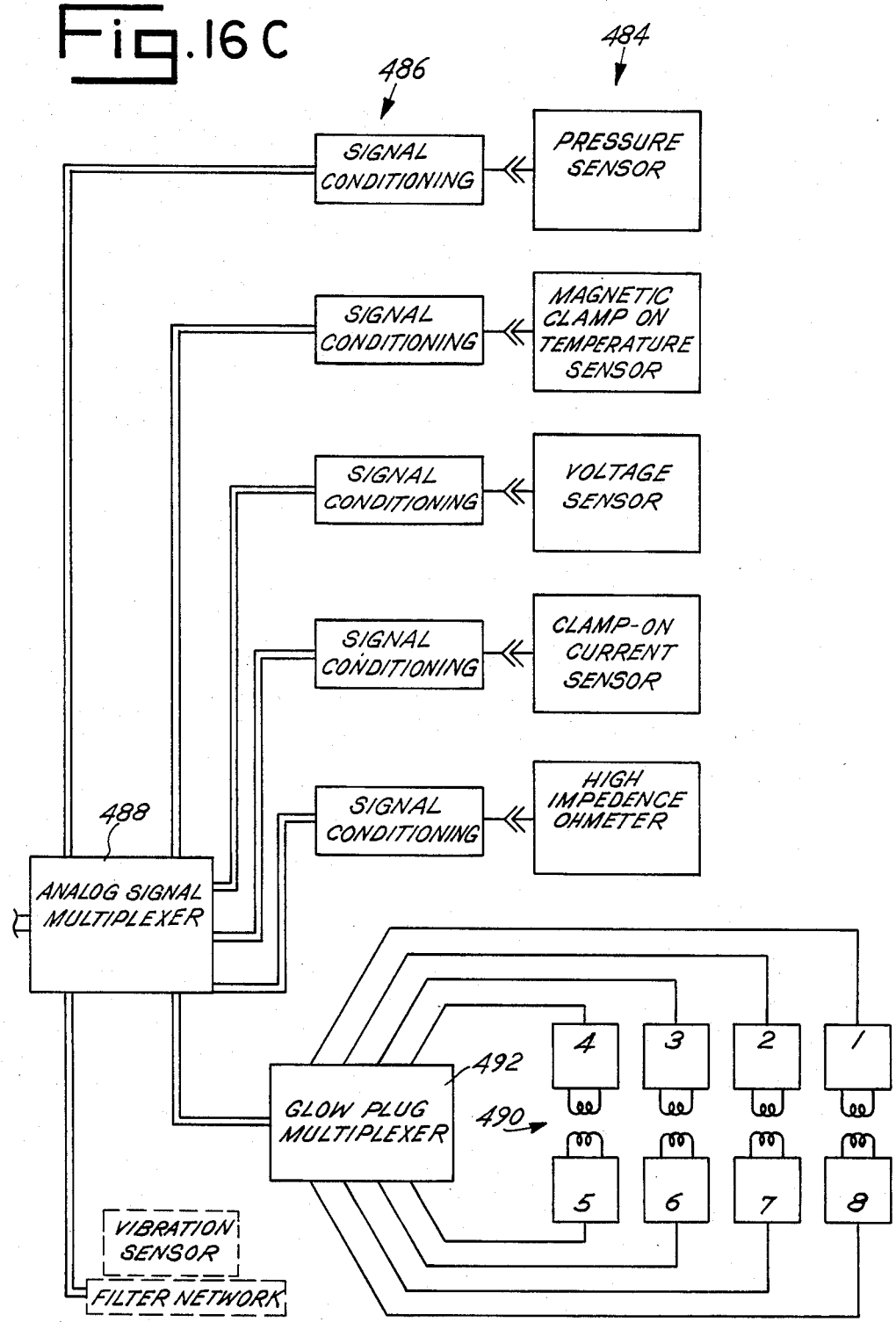

The present invention may also be implemented with a computer. For example, a microprocessor may be used to perform the function of the analog processing circuit 42 previously described. A flow chart showing interconnections for a Motorola 68000 microprocessor with the other portions of the system 30 is shown in FIGS. 16A-16C.

The sensors for pressure, temperature, voltage, current, and resistance, collectively designated as 484, and their accompanying signal conditioning circuits, collectively designated as 486, are interconnected to an analog signal multi-plexer 488. Signals from eight glow plugs 490 are transmitted to a multiplexer 492 and then to the analog signal multiplexer 488.

Signals from the analog signal mutliplexer 488 are then transmitted to an ultrafast analog to digital converter 494. This converter 494 transmits a signal to a register 496 which, in turn, transmits representative data to a main bus 498.

Digital sensors for flywheel movement, piston location, revolution speed, combustion, and strobe timing, collectively designated as 500, are interconnected directly to a register 502, which is interconnected to the main bus 498. The main bus 498 also receives data from a key pad interface 504 from which a operator may give commands.

The main bus 498 is also interconnected to a controller 505. The controller 505 includes the following:

16 Bit Central Processing Unit (CPU) 506, for performing the necessary calculations and controlling the overall operation of the system;

64 K Random Access Memory (RAM) 508 having a battery backup for storing received data;

32 K Read Only Memory (ROM) 510 stores the operational program for the machine; this operational program provides an algorithim of what measurements should be taken and what calculations performed;

Interface circuitry 512 and modem 514, so that data stored in the 64 K RAM 508 or CPU 506 may be transmitted to a separate computer for further analysis; and Clock and timer 516 for providing a reference signal for the system 30; it is estimated that the clock 516 should have a frequency of at least 8 MHz; and A plug-in remote memory module 518, is also interconnected to the main bus 498. The module 518 receives data such as normative values for a particular type of engine. This information could be transmitted, for example, via a cassette deck (not shown).

A register 520 also receives inputs from the main bus 498 and provides signals which allow a display driver 522 to power an alpha-numeric display 524.

Data transmitted to the system 30 via the remote memory module 518 could include preprogrammed, normative information regarding the signals that a certain model or type of engine would produce. These normative data could then be compared by the controller 505 to actual, measured values. Moreover, data could be programmed into the ROM 510 such that for any combination of actual and normative data, a fault in the engine 36 could be diagnosted, and a diagnosis could be displayed for the mechanic.

Alternatively, the modules could include a predetermined set of sensor signals which would be transmitted to the main bus 498, rather than the actual sensor signals. Since the inputs into the system 30 would then be known, the outputs for a properly functioning system 30 would also be known.

If the expected outputs were not received, the operator would know that the system was malfunctioning. In addition, the actual, "unexpected" outputs might indicate which portion of the system 30 was malfunctioning.

Also, the controller 505 could be programmed to transmit a "go" or "no go" signal, depending on the sensor signals that it receives. Thus, for example, the comparison between the measured values and normative values stored in the ROM 510 may be extreme, indicating that a serious malfunction exists and that continued use of the engine 36 is likely to cause significant damage to the engine 36.

Under such a condition, the system would display a "no go" signal. The mechanic or operator of the vehicle would quickly know that the vehicle should not be operated until the fault is corrected. Alternatively, if the engine 36 has no major faults, a "go" signal would be displayed, and the operator of the vehicle would know that the vehicle may be operated safely.

The controller 505 also has the capability of receiving sensor signals from more than the sensors previously described. Other sensors may include, for example, a siesmic vibration transducer mounted in the engine block 46. Such a transducer provides an electrical signal to the display representative of the torsional vibration that the engine 36 exhibits.

Figure 17:
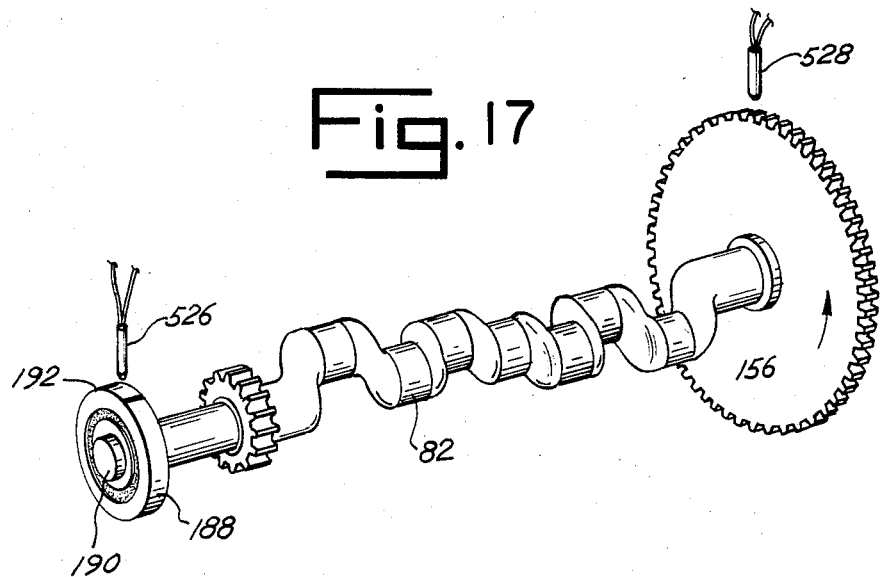
FIG. 17 is a schematic diagram showing how the sensors of the invention of FIG. 1 may be used with a harmonic balancer and flywheel of a diesel engine.
Figure 18:
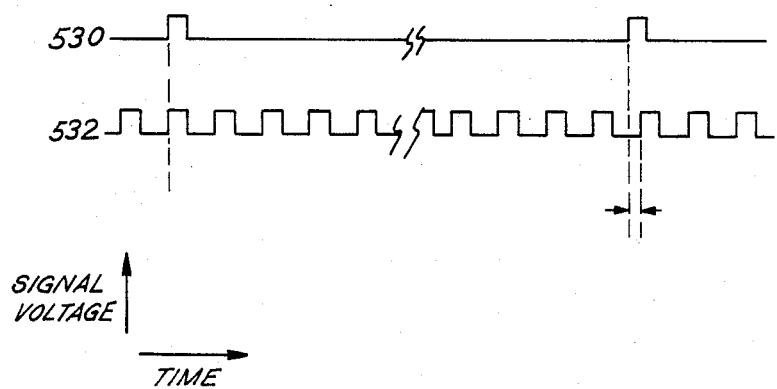
FIG. 18 is a schematic diagram showing a possible relation between the signals provided by the sensors of FIG. 17.
Figure 19:
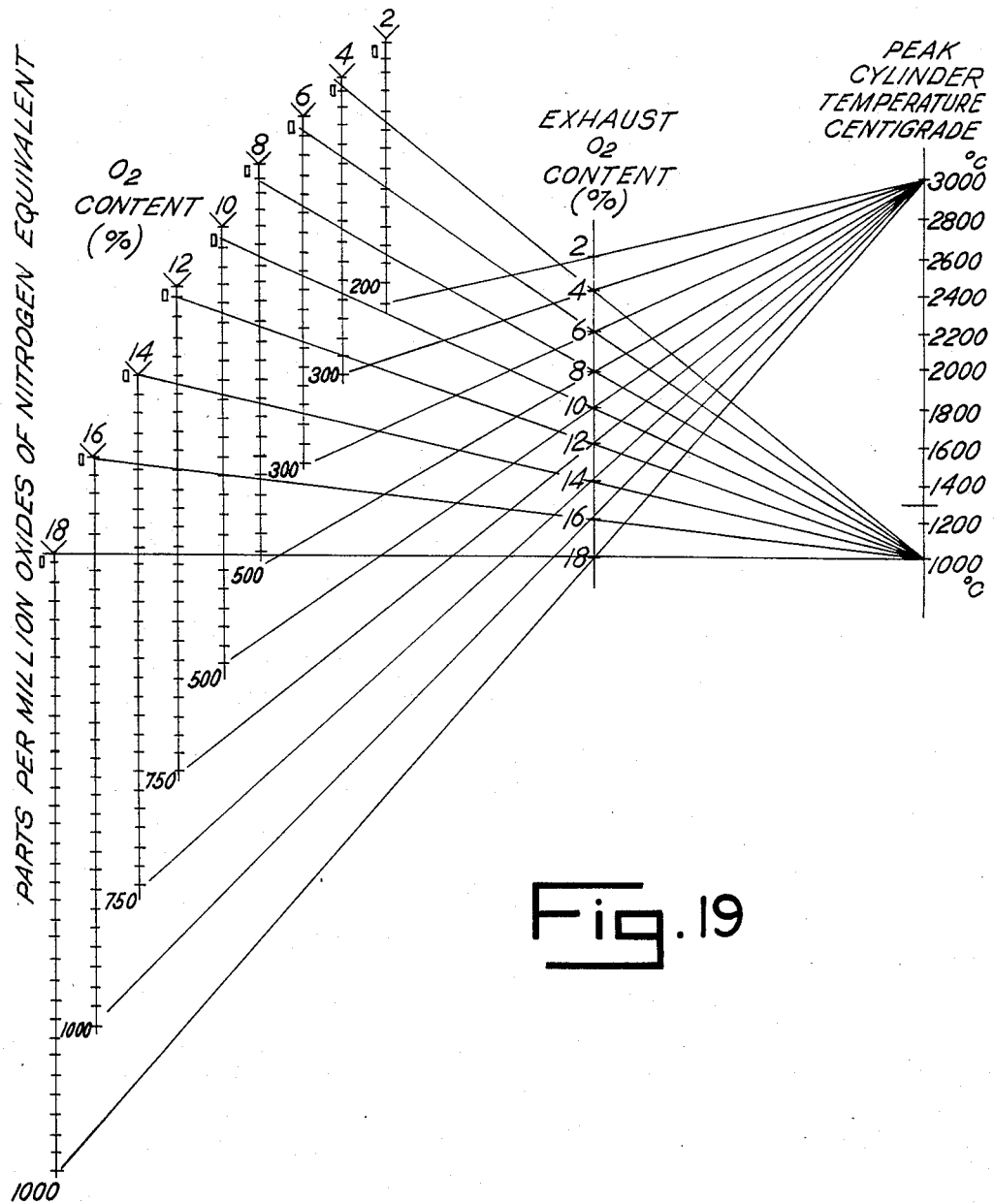
FIG. 19 is a nomograph showing an algorithum that may be used with the invention of FIG. 1 in order to determine the level of nitrogen oxides being produced by a diesel engine.

The torsional vibration of the crankshaft within the diesel engine 36 may be understood by referring to FIGS. 3 and 17. As previously discussed, the diesel engine 36 includes the crankshaft 82, having the flywheel 156 on one end 188 and a weighted disk called a harmonic balancer 188 or the second end 190.

When the combustible fuel mixture within the cylinder ignites, the piston 62 travels downward and applies a torsional force to the crankshaft 82. The application of such a torsional force causes the crankshaft 82 to twist slightly, such that one end of the crankshaft turns more or less than the other end.

If the diesel engine 36 malfunctions, the twisting, or torsional vibration, may become too large. For example, the first end 188 of the crankshaft 82 might turn 180°, while the second end 190 has turned 180.5° or more. When the first end 188 had then turned another 180°, the second end 190 might have turned only 179.5° or less.

Such torsional vibration of 0.5° or more may well cause the crankshaft 82 to quickly break. Such a circumstance could be avoided, however, if a mechanic could reliably determine how much torsional vibration the crankshaft 82 was exhibiting.

As previously indicated, the torsional vibration may be estimated by sensing the vibration exhibited by the block 46. A more direct and accurate method is shown in FIG. 17. A magnetic sensor 526 is positioned near the harmonic balancer 188 and provides an electric TDC pulse when the notch 192 of the harmonic balancer 188 passes.

Another magnetic sensor 528 is positioned near the flywheel 156 and provides an electric tooth pulse when one of the teeth 158 of the flywheel 156 passes. The electric signals, which are received by the display 34, may be represented by the upper and lower graphs 530, 532 shown in FIG. 18. The two spikes in the upper graph 530 represent the times at which the harmonic balancer notch 192 passes the magnetic sensor 526. The lower graph 532 shows the times that a flywheel tooth passes the magnetic sensor 528.

The controller 505 may receive these voltage spikes and monitor any variations between when the harmonic balancer and flywheel spikes occur. For example, in the example shown, assume that the beginning of the first flywheel pulse and harmonic balancer pulse may occur at about the same time. A second harmonic balancer pulse occurs after the harmonic balancer 188 has rotated 180° and approximately 0.03 second has elapsed. Another tooth pulse occurs after the flywheel 156 has rotated 180° and 0.03000025 second has elapsed. Upon determining these values, the controller 505 may easily determine that crankshaft 82 has twisted approximately 0.5° between the times of the first and second harmonic balancer pulses. The controller 505 may then transmit a signal to the display panels 44 to alert the mechanic to the torsional vibration that the crankshaft 82 of the engine 36 is exhibiting.

In addition, different pressure sensors, having different sensitivites to pressure, could be interconnected with the controller 505. Moreover, a printer 534 would be interconnected to the controller 505, for printing a "hard copy" of the system's analysis.

A single preferred embodiment of the present invention has been fully described herein. Only a relatively few number of possible variations have been described. It is to be understood, however, that many more changes and modifications can be made without departing from the true scope and spirit of the present invention. This true scope and spirit are defined by the following claims, to be interpreted in light of the foregoing specification.

What is claimed is:

1. An apparatus for analyzing the operation of a diesel engine, said diesel engine defining a working cycle and having at least one internal chamber and means for passing a vapor through said internal chamber, said internal chamber including a prechamber and cylinder and said vapor having a temperature, said diesel engine further including a glow plug partially within said prechamber, said glow plug having a resistance dependent upon said temperature of said vapor within said prechamber, comprising, in combination:

passive temperature sensor means, interconnected to said diesel engine, for sensing said temperature of said vapor within said prechamber of said internal chamber and for providing a temperature signal representative of said temperature, said passive temperature sensor means including impedance sensor means for sensing said resistance of said glow plug, said temperature signal being dependent upon said resistance throughout said working cycle; and display means, interconnected to said passive temperature sensor means, for monitoring said temperature signal throughout said working cycle and responsively providing a display based upon said temperature and representative of a brake mean effective temperature.

2. An apparatus for analyzing the operation of a diesel engine, said diesel engine defining a working cycle and having at least one internal chamber and means for passing a vapor through said internal chamber, said internal chamber including a prechamber and cylinder and said vapor having a temperature, said diesel engine further including a glow plug partially within said prechamber, said glow plug having two electrical contacts and a voltage between said electrical contacts dependent upon said temperature of said vapor within said prechamber, comprising, in combination:

passive temperature sensor means, interconnected to said diesel engine, for sensing said temperature of said vapor within said prechamber of said internal chamber and for providing a temperature signal representative of said temperature, said passive temperature sensor means including glow plug voltage sensor means for sensing said voltage between said electrical contacts of said glow plug, said temperature signal being dependent upon said voltage throughout said engine cycle; and display means, interconnected to said passive temperature sensor means, for monitoring said temperature signal throughout said working cycle and responsively providing a display based upon said temperature and representative of a brake mean effective temperature.

3. An apparatus as claimed in claim 1 or 2 wherein said temperature of said vapor changes throughout said work cycle and said passive temperature sensor means includes a thermal mass having a resistance to thermal change, whereby said said temperature signal is representative of both said temperature of said vapor and said changes of said temperature.

4. An apparatus as claimed in claim 3 wherein said display represents an average of said temperatures of said vapor.

5. An apparatus as claimed in claim 4 wherein said diesel engine is operable in a cranking state and a running state and said passive temperature sensor means senses said temperature in both said cranking and running states.

6. An apparatus for analyzing the operation of a diesel engine, said diesel engine defining a working cycle and having at least a first and second internal chamber and means for selectively passing a vapor through said first and second internal chambers, said vapors defining at least first and second temperatures, corresponding to said first and second internal chambers, comprising, in combination:

passive temperature sensor means, interconnected to said diesel engine, for sensing said first and second temperatures of said vapors within said first and second internal chambers and for providing temperature signals representative of said first and second temperatures; and display means, interconnected to said temperature sensor means, for separately monitoring said temperature signals throughout said working cycle and for responsively providing a display for each of said internal chambers, based upon said temperatures of said vapors and representative of brake mean effective temperatures for said first and second internal chambers.

7. An apparatus as claimed in claim 6 wherein said first internal chamber includes a first prechamber and cylinder and said second internal chamber includes a second prechamber and cylinder and said passive temperature sensor means senses said temperatures of said vapors within first and second prechambers.

8. An apparatus as claimed in claim 7 wherein said diesel engine includes a first and second glow plug partially within said first and second prechambers, said first and second glow plugs each having a resistance dependent upon said temperature within said first and second prechambers and said temperature means includes first and second impedance sensor means for sensing said resistance of said first and second glow plugs, said temperature signal being dependent upon said resistances of said first and second glow plugs throughout said working cycle.

9. An apparatus as claimed in claim 7 wherein said diesel engine includes a first and second glow plug partially within said first and second prechambers, said first and second glow plugs each having two electrical contacts and a voltage dependent upon said temperature within said first and second prechambers and said passive temperature sensor means includes first and second voltage sensor means for sensing said voltages of said first and second glow plugs, said temperature signal being dependent upon said voltages of said first and second glow plugs throughout said working cycle.

10. An apparatus as claimed in claim 8 or 9 wherein said temperatures of said vapors change throughout said work cycle and said passive temperature sensor means includes a thermal mass having a resistance to thermal change, whereby said temperature signals are representative of both said temperature of said vapor and said changes of said temperature.

11. An apparatus as claimed in claim 10 wherein said display represents an average of said temperatures of said vapors.

12. An apparatus as claimed in claim 11 wherein said diesel engine is operable in a cranking state and a running state and said passive temperature sensor means senses said temperature in said cranking and running states.

13. An apparatus as claimed in claim 6 wherein said first internal chamber includes a first cylinder and said second internal chamber includes a second cylinder and said passive temperature sensor means senses said temperatures of said vapors within said first and second cylinders.

14. An apparatus as claimed in claim 7 or 13 wherein said passive temperature sensor means includes a first and second thermocouple for said first and second chambers.

15. A system for analyzing the operation of a diesel engine, said diesel engine including an exhaust manifold having a temperature and said diesel engine also defining a work cycle and having at least one internal chamber and means for passing a vapor through said internal chamber, said vapor having a temperature, comprising, in combination:

passive temperature sensor means, interconnected to said diesel engine, for sensing said temperature of said vapor within said internal chamber and for providing a temperature signal representative of said temperature;

magnetically attached thermocouple sensor means, interconnected to said exhaust manifold of said diesel engine, for providing a manifold temperature signal representative of said temperature of said exhaust manifold; and display means, interconnected to said magnetically attached thermocouple sensor means and passive temperature sensor means, for receiving said temperature signal throughout said engine cycle and responsively providing a display based upon said temperature of said vapor within said internal chamber and representative of a brake mean effective temperature, and for receiving said exhaust manifold temperature signal and responsively providing a display based thereon.

16. A system as claimed in claim 15 wherein said diesel engine defines a crankshaft having a rotational speed and said system further comprises rotation detector means, interconnected to said diesel engine, for sensing said rotational speed of said crankshaft and responsively providing a rotation speed signal representative of said rotational speed, and wherein said display means is interconnected to said rotation detector, receives said rotation speed signal, and responsively provides a display based thereon.

17. A system as claimed in claim 16 wherein said diesel engine includes a pressure compartment and said system further comprises pressure transducer means, interconnected to said diesel engine, for sensing said pressure of said pressure compartment and responsively providing a pressure signal representative of said pressure and wherein said display means is interconnected to said pressure sensor means, receives said pressure signal, and responsively providing a display based thereon.

18. A system as claimed in claim 17 further comprising voltage sensor means, interconnected to said electric power source of said diesel engine, for sensing said voltage of said electric power source and responsively providing a voltage signal representative of said voltage and wherein said display means is interconnected to said voltage sensor means, receives said voltage signal and responsively providing a display based thereon.

19. A system as claimed in claim 17 wherein said diesel engine includes a crankcase and leakage means for passing said vapor from said internal chamber to said crankcase and said system further comprises an orifice, interconnecting said diesel engine with an environment, for passing vapor from said crankcase to said environment, and vapor flow pressure sensor means, interconnected to said crankcase, for sensing said pressure within said crankcase and responsively providing a vapor flow signal representative of said vapor passing through said orifice from said crankcase to said environment, and wherein said display means is interconnected to said vapor pressure sensor means, receives said crankcase pressure signal, and responsively provides a display based thereon.

20. A system as claimed in claim 19 wherein said diesel engine defines running and static states, said processor means receives said temperature signals during both said running and static states, makes a comparison of said temperature signals so received, determines and transmits a calibration signal representative of said comparison of said temperature signals, and wherein said display means receives said calibration signal and responsively provides a display based thereon.

* * * * *